(12) United States Patent
Burri et al.

(10) Patent No.: US 8,378,878 B2
(45) Date of Patent: Feb. 19, 2013

(54) CREATING AND PROCESSING UNIVERSAL RADAR WAVEFORMS

(75) Inventors: Jeremy Francis Burri, Encino, CA (US); Michael Howard Farris, Thousand Oaks, CA (US); Matthew Michael Pohlman, Montrose, CA (US); Randall Edward Potter, Northridge, CA (US)

(73) Assignee: Areté Associates, Northridge, CA (US)

( * ) Notice: Subject to any disclaimer, the term of this patent is extended or adjusted under 35 U.S.C. 154(b) by 385 days.

(21) Appl. No.: 12/851,469

(22) Filed: Aug. 5, 2010

(65) Prior Publication Data

US 2012/0032839 A1 Feb. 9, 2012

(51) Int. Cl.
 G01S 13/00 (2006.01)
 G01S 13/08 (2006.01)
 G01S 13/52 (2006.01)
(52) U.S. Cl. ........ 342/25 R; 342/134; 342/160; 342/196
(58) Field of Classification Search .......... 342/134–137, 342/160, 196
 See application file for complete search history.

(56) References Cited

U.S. PATENT DOCUMENTS

| 4,355,311 | A | * | 10/1982 | Frosch et al. | 342/25 A |
|---|---|---|---|---|---|
| 4,510,497 | A | * | 4/1985 | Onozawa | 342/51 |
| 4,724,418 | A | | 2/1988 | Weindling | |
| 5,233,356 | A | | 8/1993 | Lee et al. | |
| 5,371,504 | A | * | 12/1994 | Lewis | 342/114 |
| 5,486,830 | A | | 1/1996 | Axline, Jr. et al. | |
| 5,659,318 | A | * | 8/1997 | Madsen et al. | 342/25 C |
| 6,720,909 | B1 | * | 4/2004 | Dedden | 342/137 |
| 7,369,083 | B2 | * | 5/2008 | Budic | 342/159 |
| 7,800,529 | B2 | * | 9/2010 | Burri et al. | 342/194 |
| 7,973,703 | B2 | * | 7/2011 | Burri et al. | 342/147 |
| 2002/0128039 | A1 | | 9/2002 | Finn | |
| 2003/0038741 | A1 | | 2/2003 | Greer | |
| 2003/0151542 | A1 | * | 8/2003 | Steinlechner et al. | 342/70 |
| 2003/0179136 | A1 | | 9/2003 | Kohno et al. | 342/360 |
| 2004/0061639 | A1 | * | 4/2004 | Voigtlaender et al. | 342/70 |
| 2005/0156780 | A1 | * | 7/2005 | Bonthron et al. | 342/107 |
| 2005/0179582 | A1 | | 8/2005 | Woodington et al. | |
| 2005/0237236 | A1 | * | 10/2005 | Budic | 342/159 |
| 2006/0125682 | A1 | | 6/2006 | Kelly, Jr. et al. | |
| 2006/0227042 | A1 | | 10/2006 | Budic | |
| 2006/0262007 | A1 | * | 11/2006 | Bonthron et al. | 342/70 |
| 2006/0279452 | A1 | | 12/2006 | Thomas et al. | |

(Continued)

OTHER PUBLICATIONS

U.S. Appl. No. 12/840,035, filed Jul. 20, 2010, entitled "Method and Apparatus for Creating Universal Radar Waveforms," Office Action, mailed Jan. 25, 2011.

(Continued)

*Primary Examiner* — Jack W Keith
*Assistant Examiner* — Peter Bythrow
(74) *Attorney, Agent, or Firm* — McDermott Will & Emery LLP

(57) ABSTRACT

A new approach to radar imaging is described herein, in which radar pulses are transmitted with an uneven sampling scheme and subsequently processed with novel algorithms to produce images of equivalent resolution and quality as standard images produced using standard synthetic aperture radar (SAR) waveforms and processing techniques. The radar data collected with these waveforms can be used to create many other useful products such as moving target indication (MTI) and high resolution terrain information (HRTI). The waveform and the correction algorithms described herein allow the algorithms of these other radar products to take advantage of the quality Doppler resolution.

68 Claims, 36 Drawing Sheets

U.S. PATENT DOCUMENTS

2007/0165488 A1* 7/2007 Wildey .................. 367/101
2007/0264945 A1* 11/2007 Carrez .................. 455/118
2009/0195442 A1* 8/2009 Burri et al. ............. 342/194
2010/0302092 A1* 12/2010 Burri et al. ............. 342/194

OTHER PUBLICATIONS

U.S. Appl. No. 12/840,035, filed Jul. 20, 2010, entitled "Method and Apparatus for Creating Universal Radar Waveforms," Notice of Allowance, mailed Apr. 21, 2011.

U.S. Appl. No. 12/026,508, filed Feb. 5, 2008, entitled "Method and Apparatus for Creating Universal Radar Waveforms," (now U.S. Patent No. 7,800,529, issued Sep. 21, 2010), Notice of Allowance, mailed Apr. 21, 2010.

U.S. Appl. No. 12/840,035, filed Jul. 20, 2010, entitled "Method and Apparatus for Creating Universal Radar Waveforms," Office Action, mailed Sep. 28, 2010.

* cited by examiner

| p | w(i) | | | | | |
|---|---|---|---|---|---|---|
| 3 | 110 | | | | | |
| 5 | 01001 | | | | | |
| 7 | 11101 | 00 | | | | |
| 11 | 11011 | 10001 | 0 | | | |
| 13 | 01011 | 00001 | 101 | | | |
| 17 | 01101 | 00011 | 00010 | 11 | | |
| 19 | 11001 | 11101 | 01000 | 0110 | | |
| 23 | 11111 | 01011 | 00110 | 01010 | 000 | |
| 29 | 01001 | 11101 | 00010 | 01000 | 10111 | 1001 |
| 31 | 11101 | 10111 | 10001 | 01011 | 10000 | 10010 | 0 |
| 37 | 01011 | 00101 | 11100 | 01000 | 01000 | 11110 | 10011 | 01 |
| 41 | 01101 | 10011 | 10000 | 01010 | 11010 | 10000 | 01110 | 01101 | 1 |

If p = 1 mod 4, w(0)=0
If p = 3 mod 4, w(0)=1

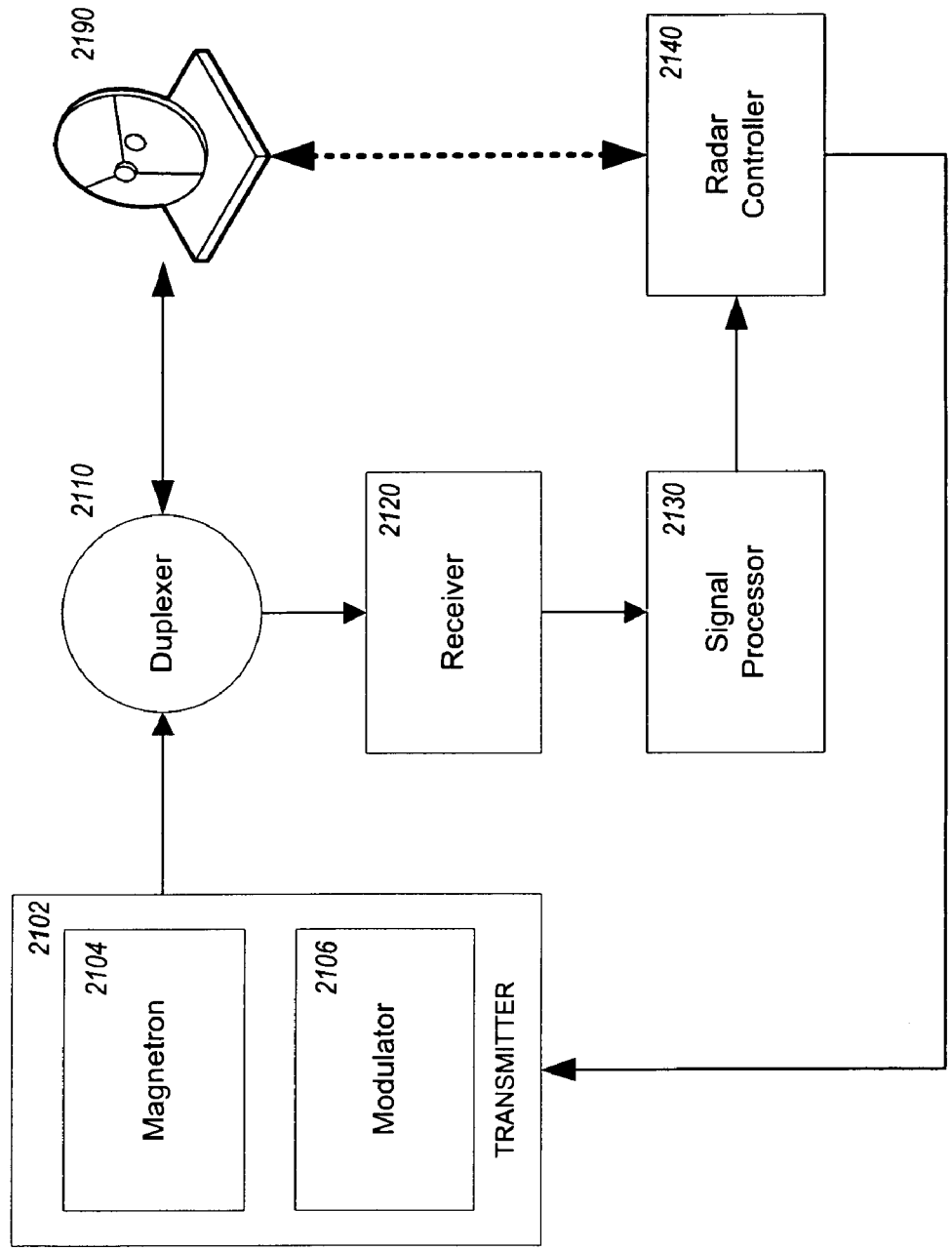

CREATING AND PROCESSING UNIVERSAL RADAR WAVEFORMS

BACKGROUND

1. Field

This disclosure relates generally to radar image processing, including methods and apparatus for creating and processing universal radar waveforms.

2. Background

Radio detection and ranging (radar) technology transmit and receive pulsed electromagnetic waves to detect objects. In radar, an electromagnetic pulse is transmitted from a radar platform, and this transmitted pulse can be scattered back to the radar platform by various objects. The roundtrip time taken by the pulse to travel from the radar platform to the scattering object and back therefrom may be proportional to the distance between the radar platform and the object. The transmitted pulse may generally be sent with a characteristic waveform such that the returned pulse will be scattered back with a shape resembling this transmitted waveform. Multiplying the returned energy by this waveform may allow the returns to be sampled in time to yield a single complex number representation for the returned energy as a function of time—referred to as complex radar pulses. Since the complex radar pulses may be a function of time and the distance may be proportional to the roundtrip travel time of the pulses, these complex radar pulses can be thought of as samples of the objects present at various distances from the radar. This is how distance can be measured using a single radar pulse.

If two pulses are used, the line-of-sight motion of an object can also be determined. If the object is at a certain distance from the radar platform and is moving toward the radar platform, then the complex radar pulses may rotate in phase with a positive frequency. Similarly, if the object is moving away from the radar platform, then the complex radar pulses may rotate in phase with a negative frequency. This effect is referred to as the Doppler effect. If multiple pulses at a given distance are used in combination, multiple Doppler frequencies can be measured by decomposing the complex radar pulses into sine and cosine waves at these frequencies. The energies observed at these various frequencies is called the Doppler spectrum.

However, if the radar platform is moving, then returns that appear at various Doppler frequencies can be the result of multiple stationary objects located at various different positions. For example, assume that a radar pulse is transmitted in a direction perpendicular to the motion of the radar itself and define the vector pointing from the radar to a stationary object that scatters back pulse energy as the pointing vector. If the pointing vector to this object is perpendicular to the direction of the radar motion, then the complex radar pulses for this object may appear at zero Doppler frequency. If, however, the pointing vector is positively aligned with the radar motion vector, then the complex radar pulses for this object may appear at a positive Doppler frequency proportional to the apparent line-of-sight motion of the object relative to the radar platform.

This separation of stationary objects within a Doppler spectrum obtained from a moving radar platform may have many different applications. For example, it is the foundation of what is called synthetic aperture radar (SAR) imaging. While the problems discussed herein are not limited to SAR imaging applications, SAR images provide an illustrative example useful for describing deficiencies in the prior art. Those skilled in the art will recognize that the problems addressed herein apply more globally to radar returns and the processing thereof, and are not limited to their use in SAR images, which is only one example.

In SAR imaging, images are produced by post-processing a series of complex radar pulses from a moving radar platform. In this imaging method, the Doppler resolution of a radar image (which relates to the distance between objects perpendicular to the radar line-of-sight, or distance in the cross-range direction) may be inversely proportional to the length of the temporal aperture over which the Doppler decomposition is performed (this decomposition is also referred to as coherent integration). Increasing the time over which coherent integration is performed may provide finer cross-range resolution, which may be a desirable quantity for SAR imagery.

Multiple intelligence, surveillance and reconnaissance (ISR) missions may require different collection modes that may be mutually incompatible. For example, a common type of ISR mission for which SAR radar platforms may be used is moving target indication (MTI) missions. MTI missions may require many pulses per detection opportunity along with a narrow beam. In contrast, detailed imaging missions may require the collection of continuous pulse streams using broad beams. As these modes may be inherently incompatible, no MTI information may be available during image mode collection and vice versa.

One approach that may be taken to address the incompatible modes of operation under which the radar platform is required to collect data is to have the radar platform transmit pulses for both modes over the same time period. However, assuming that a fixed number of samples may be transmitted and collected over the same time period, the radar resources collected over the same time period for each mode may be effectively halved. This can result in a dramatic, corresponding decrease in the quality of resulting SAR images.

In short, generating high quality SAR images using existing radar imaging schemes may require numerous radar resources. For example, existing radar imaging schemes may be directed to using sampling patterns that allow for straightforward processing to generate the radar data output. While existing sampling patterns may have known and straightforward processing techniques, they may require a high number of pulses and a large amount of radar resources. Any reduction in the number of pulses may result in significant degradation in processed radar returns.

U.S. patent application Ser. No. 12/026,508, entitled "Method and Apparatus for Creating and Processing Universal Radar Waveforms," filed Feb. 5, 2008, attorney docket number 81085-12, discloses a time domain approach that addresses these problems, the entire content of which is incorporated herein by reference. However, applicants have since discovered other approaches which provide even greater flexibility.

SUMMARY

A radar transmission system may include a transmitter system and an antenna system.

The transmitter system may be configured to generate one or more radar signals.

The antenna system may have spatially-separated elements and may be configured to radiate the one or more radar signals from the spatially-separated elements.

The transmitter system and/or the antenna system may be configured such that the radiated radar signals include a pattern of spatially-separated radar pulses, each from a different one of the spatially-separated antenna elements. The pattern of pulses may have at least two neighboring radar pulses that have a spatial separation that is substantially unequal to the spatial separation between at least two other neighboring radar pulses in the pattern of pulses, a mainlobe radiation pattern with a width that is near or substantially equal to the minimum possible mainlobe width, and/or sidelobe radiation patterns with substantially even energy distribution.

The radar transmission system may include a processing system configured to generate pulses using a Fourier transform which are used by the transmitter system to generate the one or more radar signals.

The radiated pattern of pulses may have a quadratic residue (QR) pattern or a pseudo-random pattern.

The elements of the antenna system may be spatially-separated in two dimensions. The pattern of radar pulses may include pulses spatially-separated in the two dimensions. The substantially unequal separation may include substantially unequal separation in the spatial locations from which the radar pulses are radiated by the antenna system in both of the two dimensions.

The transmitter system may be configured such that the radiated radar signals include a pattern of time-separated radar pulses having at least two sequential radar pulses with a time separation that is substantially unequal to the time separation between at least two other sequential radar pulses in the pattern of pulses.

The antenna elements may be unequally spaced.

The antenna elements may be equally spaced, but the transmission system may be configured to selectively drive the elements so as to cause the driven elements to have the substantially unequal spatial separations.

A radar reception system may include a receiver and a processing system.

The receiver may be configured to receive a radar signal which includes a first data set having a plurality of values based on a radar waveform return from a set of transmitted radar pulses.

The processing system may be configured to create a second data set comprising the first data set minus at least one significant value from the first data set and its effects on other values within the first data set. This may occur when the set of transmitted radar pulses was transmitted with a spatial separation between at least two neighboring pulses that is substantially unequal to the spatial separation between at least two other neighboring pulses in the set, a mainlobe radiation pattern with a width that is near or substantially equal to the minimum possible width, and/or sidelobe radiation patterns with a substantially even distribution of energy.

The processing system may be configured to create a third data set comprising the at least one significant value from the first data set, and to combine the second and third datasets.

The first data set may include a plurality of transformed values. The radar plurality of transformed values may be frequency values.

The at least one significant value may include a peak value in a frequency domain.

The second data set may include a number of peak values from the first data set chosen based on predetermined selection criteria.

The processing system may be configured to determine the effects of the at least one significant value by calculating a plurality of propagated effects from the at least one significant value.

The processing system may be configured to create the second data set by identifying at least one peak value in the first data set, creating a peak correction function approximation using the at least one peak value, and removing the peak correction function approximation from the first data.

The pattern of radar pulses may include pulses spatially-separated in two dimensions, and the substantially unequal separation includes substantially unequal separation in both of the two dimensions.

The radiated radar signals may include a pattern of time-separated radar pulses having at least two sequential radar pulses with a time separation that is substantially unequal to the time separation between at least two other sequential radar pulses in the pattern of pulses.

The pattern of radar pulses may have at least two neighboring radar pulses that have a spatial separation that is at least twice the shortest spatial separation between at least two other neighboring radar pulses in the pattern of pulses.

Non-transitory, tangible, computer-readable storage media may contain programming code which, when executed by a computer system, causes the radar transmission and/or reception systems to function as recited herein in whole or in part.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

FIG. 3 is a table of binary patterns of a first dozen linear quadratic residue (QR) patterns.

FIG. 23 is a block diagram of a radar system that may be used in the generation, transmission, and receipt of the URW.

DETAILED DESCRIPTION

Figure 1:
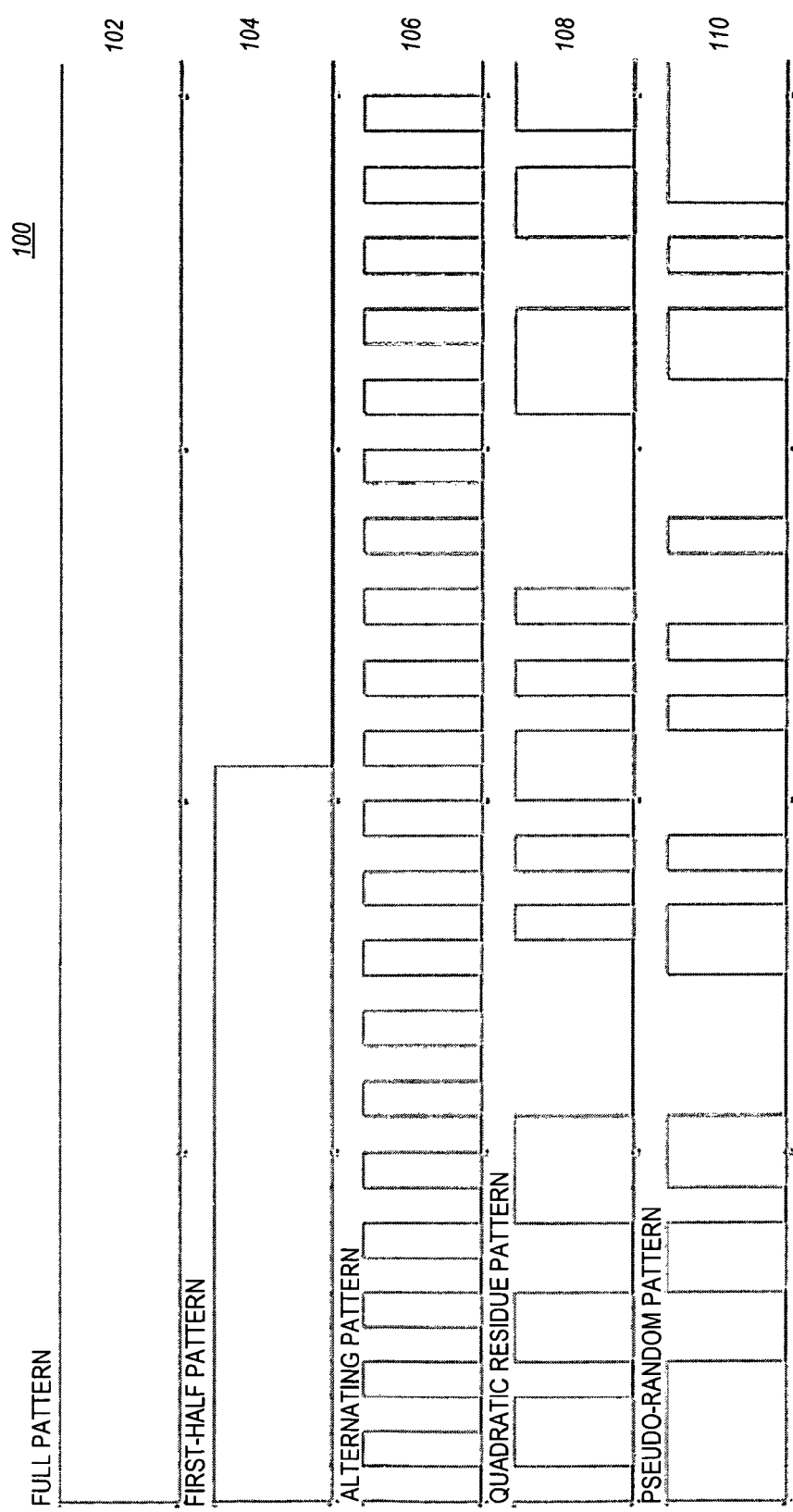
FIG. 1 compares plots of various universal radar waveform (URW) sampling patterns of length 41, including a full pattern, a first-half pattern, an alternating pattern, a quadratic residue (QR) pattern and a pseudo-random pattern.

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

The word "exemplary" is used herein to mean "serving as an example, instance, or illustration." Any embodiment described herein as "exemplary" is not necessarily to be construed as preferred or advantageous over other embodiments. In addition, the headings and sub-headings used herein are not to be taken as limiting in any sense and are used for ease of reference to the various parts of the document.

The techniques described herein may use fewer radar resources while maintaining the quality of processed radar returns. SAR images will be used in a demonstrative fashion to help illustrate the technologies disclosed herein. However, the technologies are not limited to use with SAR images, and those skilled in the art will recognize their applicability to a wide range of radar applications. For example, the technologies described herein are applicable to applications such as moving target indication (MTI) and high resolution terrain information (HRTI).

With standard, evenly sampled SAR waveforms, image resolution may become finer as the temporal aperture (i.e., the period of time during which the radar pulses are transmitted) used for coherent integration increases. In one approach, an uneven sampling waveform, coupled with appropriately tailored post-processing algorithms, is used to produce images of similar quality and fewer radar pulses over the same temporal aperture.

The pulse repetition frequency (PRF) of a radar waveform is equal to the number of pulses that are transmitted by the radar per second. The inverse of this baseline PRF is a time increment ($\Delta t$) that is the smallest time increment between pulses. A universal radar waveform (URW) is defined as a function of a radar waveform that transmits pulses at a baseline PRF. In one exemplary approach, the URW is constructed of a radar waveform that includes pulses transmitted at multiple PRFs, with each PRF being a multiple of the baseline PRF.

In one exemplary approach, the URW is defined in increments of $\Delta t$ (i.e., the inverse of the baseline PRF) such that the time separation between pulses is equal to integer multiples of $\Delta t$. For example, if a baseline PRF is 10 pulses/second, then a standard waveform over the course of 1 second would consist of 10 pulses, each separated in time by 0.1 seconds. Thus, in this approach, the URW may be defined by pulses that are separated by times that are multiples of 0.1 seconds (0.2, 0.4, 0.5, etc.). For example, a series of pulses that are transmitted over 1 second may be described as follows: Pulse 2 is transmitted 0.2 seconds after Pulse 1, Pulse 3 is transmitted 0.1 seconds after Pulse 2, Pulse 4 is transmitted 0.4 seconds after Pulse 3, and Pulse 5 is transmitted 0.2 seconds after Pulse 4.

A convenient representation of the URW is one where a binary string of ones and zeros represents when pulses have or have not been transmitted. For example, utilizing the 1 second example again, if a one ("1") represents that a pulse is transmitted at that integer multiple of $\Delta t$ and a zero ("0") represents that a pulse is not transmitted at this time, the previous URW example can be represented by a 10 character binary string [1,0,1,1,0,0,0,1,0,1]. Similarly, a standard waveform transmitting 10 pulses, each separated by 0.1 seconds, can be represented as [1,1,1,1,1,1,1,1,1,1].

The definition for the URW is flexible and general in its application. For example, if the desired shortened separation between pulses is not an integer multiple of a predefined $\Delta t$, then the baseline PRF can be sufficiently increased (and thereby the $\Delta t$ can be decreased) such that all time separations between pulses can be defined in terms of integer multiples of this new $\Delta t$. Conversely, the baseline PRF can be sufficiently decreased if a larger separation between pulses is desired. In this manner, the URW is a general representation of an unevenly pulsed waveform that can be defined in terms of a sparse, uneven sampling of a waveform with a baseline PRF.

This binary string representation can be thought of as a sampling pattern of the underlying baseline PRF. For example, the exemplary URW above (i.e., [1,0,1,1,0,0,0,1,0,1]) can be described as a sampling pattern of the same binary sequence multiplied by the baseline PRF representation, since [1,0,1,1,0,0,0,1,0,1]×[1,1,1,1,1,1,1,1,1,1]=[1,0,1,1,0,0,0,1,0,1]. Examples of various URW sampling patterns are shown in FIG. 1, which contain plots of the URW sampling patterns of length 41, respectively referred to as a full pattern (plot 102), a first-half pattern (plot 104), an alternating pattern (plot 106), a QR pattern (plot 108), and a pseudo-random pattern (plot 110).

In radar imaging, the frequency response of the URW pattern can be very important. The URW representation described above allows the analysis of both the frequency response of the sampling pattern and how the sampling pattern affects the characteristics of the waveform itself. Since the URW is defined as a function of time (e.g., integer increments of $\Delta t$), a Fourier representation (decomposition in sine and cosine waves) shows how the URW is defined in frequency. Different radar applications may be optimized by ensuring or designing certain characteristics in the Fourier transform of the URW. With the inventive sampling and processing techniques disclosed herein, these characteristics may be selected and utilized without sacrificing operational efficiency or radar output qualities.

For SAR images, for example, the narrowness of the width of the main lobe of the URW frequency response corresponds to the radar imaging resolution, and the integrated sidelobe energy corresponds to blurring of the radar image. Therefore, the best qualitative sampling pattern for SAR applications may have a frequency response with both a narrow main lobe and small sidelobes, though some tradeoffs between the two are inevitable. A narrow main lobe may mean that the bulk of the energy response occurs in a narrow frequency range; this may indicate that the observed energy at a particular frequency generally occurs as the result of energy that is actually present at that frequency and no others. Flat sidelobes may mean that frequencies other than that of the main lobe have low energy responses; this may indicate that the observed energy at a particular frequency generally does not respond to frequencies other than the frequency of interest. In other words, having flat sidelobes may mean that the resultant sidelobe energy of the waveform frequency response is distributed as evenly as possible. This even distribution may ensure that any single sidelobe peak is as low as possible relative to the main lobe peak. Flat sidelobes may maximize the main lobe-to-maximum sidelobe energy ratio. Those skilled in the art will recognize and appreciate that other radar applications may have different desired optimal Fourier transform characteristics. Generally speaking, the sampling and processing techniques disclosed herein may allow for such characteristics to be chosen and applied for any given application, not limited to SAR imaging.

To provide further background to the use of URW, some details of sampling data using even and uneven sampling will be discussed.

Figure 2A:
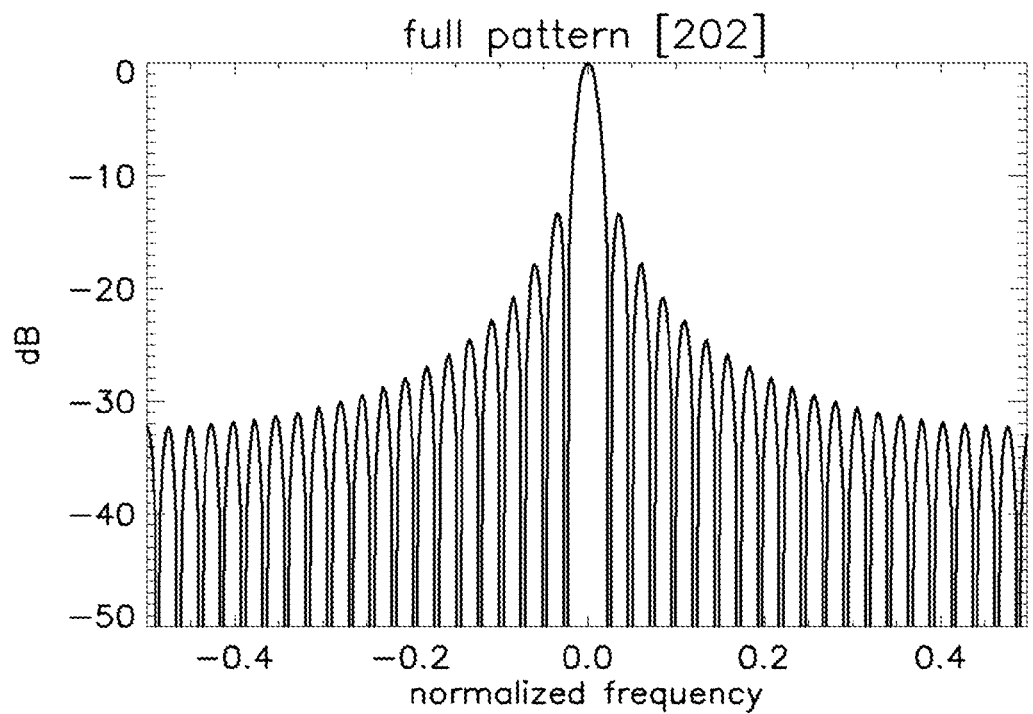
FIGS. 2A-E compare plots of the frequency response for the URW sampling patterns shown in FIG. 1.
Figure 2B:
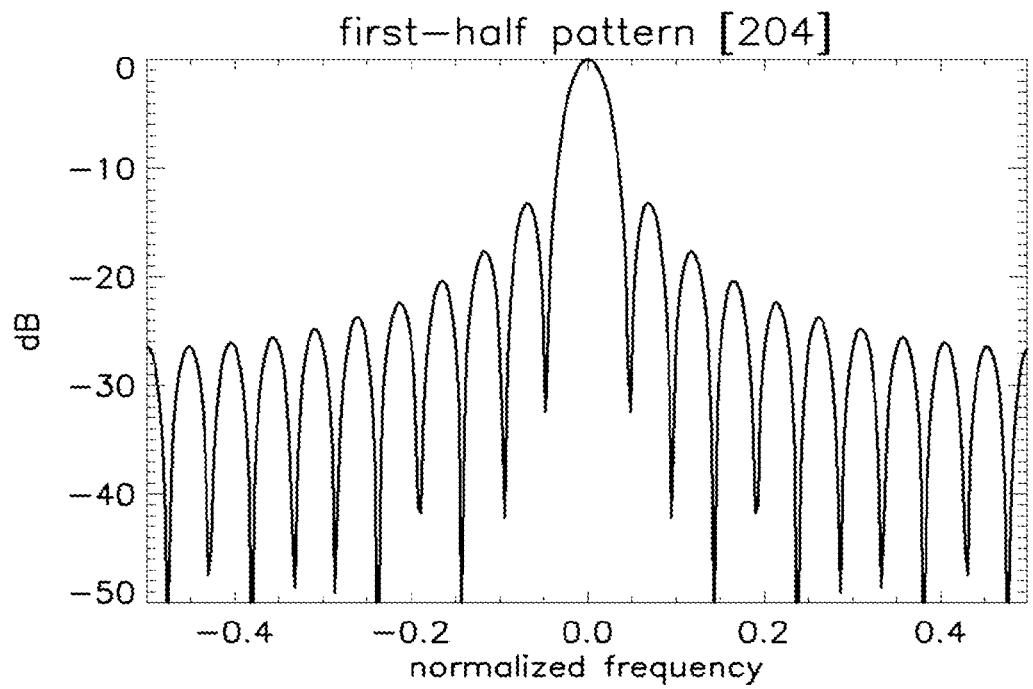
Figure 2C:
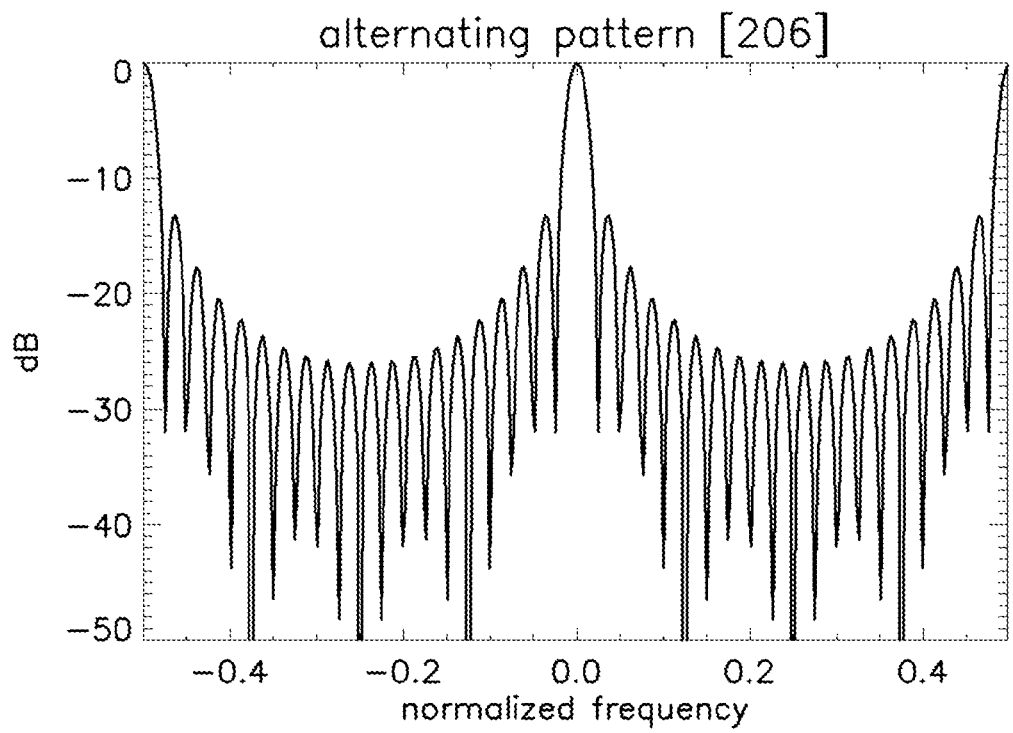
Figure 2D:
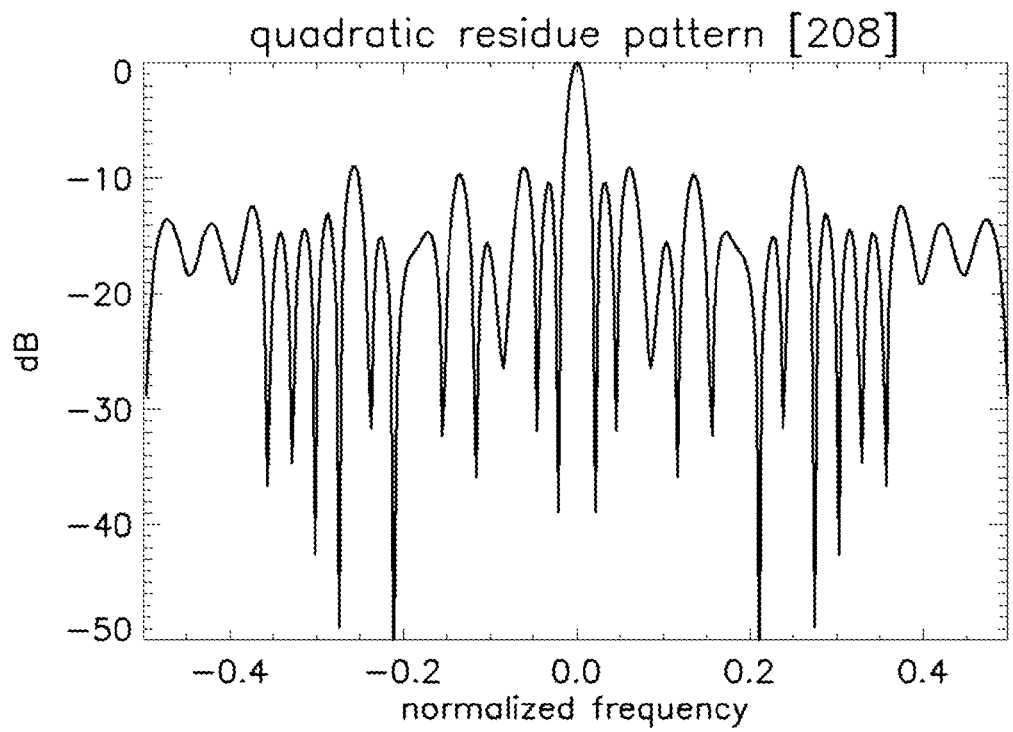
Figure 2E:
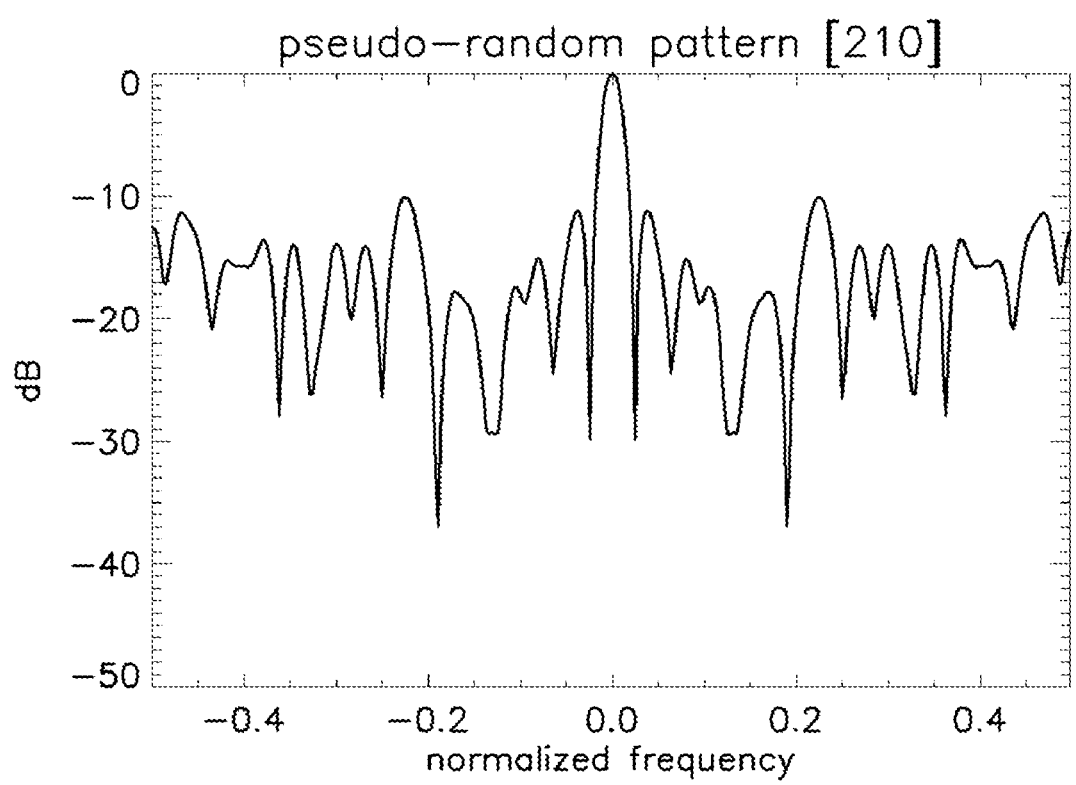

Two regular patterns (those whose sampling is more even or regular) using about half of the pulses of a full sampling pattern will be compared to the full sampling pattern: the first-half pattern and the alternating pattern. These patterns are shown visually in the first three plots of FIG. 1, and the frequency response of each can be seen in FIGS. 2A-E, which illustrates the frequency response interpolated by a factor of eight for the following URW sampling pattern of length 41 shown in FIG. 1: the full pattern 102 (plot 202, FIG. 2A), the first-half pattern 104 (plot 204, FIG. 2B), the alternating pattern 106 (plot 206, FIG. 2C), the QR pattern 108 (plot 208, FIG. 2D), and the pseudo-random pattern 110 (plot 210, FIG. 2E).

The main lobe width is twice as wide for the first-half pattern than for the full pattern, effectively making the SAR image resolution coarser by a factor of two. In addition, the sidelobes are wider by the same factor and pushed out in frequency by a factor of two, though they decay in much the same way as the full pattern. Similarly, just as a ½ sampling makes the image resolution more coarse by a factor of 2, a 1/n sampling pattern makes the image resolution more coarse by a factor of n.

The alternating pattern has a different frequency response. The main lobe width is the same as the fully filled case, and the first few sidelobes decay just as quickly. However, a significant difference occurs near frequencies that are one-half the PRF (also referred to as the Nyquist frequency), where a large sidelobe response is seen at these frequencies from the alternating pattern. Using every n-th sample not only has the same narrow main peak and large near Nyquist sidelobes, but other large sidelobes as well. Accordingly, reducing the sampling by 50% or more but retaining an even sampling pattern has the undesired effect of reducing the quality of radar output data (including but not limited to output data useful for generating SAR images).

The first of two types of uneven sampling patterns will now be described. As mentioned previously, one goal may be to generate an equivalent quality SAR image using fewer radar pulses than standard methods. As shown above, some patterns using fewer pulses have frequency responses with a narrow main lobe, yet their sidelobes are high. Others have flatter sidelobes, yet their main lobe widths are wider. For the URW, a sampling pattern is sought that can provide a narrow main lobe and flat sidelobes in the same pattern.

In one approach, one set of sampling patterns that have these desired URW properties may be those that implement a property of number theory referred to as the quadratic residue. For background, modular arithmetic uses only the numerical remainder that results when one integer is divided by another integer. For example, 15 mod 4 is notation that refers to the remainder that results from dividing the integer 15 by the integer 4. The integer 4 divides into 15 three times, which leaves a remainder of 3. Therefore 15 mod 4 is 3. A quadratic residue is then defined as follows. Let p be an odd prime number (or any prime number greater than 2). Further, an integer i is said to be a quadratic residue of p if and only if there exists an integer r, where $0 < r < p$ and that $r^2 = i$ mod p.

For example, let 5 be the prime number of interest, p. Therefore, for $r = [1,2,3,4]$, the squares of r ($r^2 = [1,4,9,16]$) are divided by p and their respective remainders ([1 mod 5, 4 mod 5, 9 mod 5, 16 mod 5] = [1,4,4,1]) are found. Therefore, from this definition, the integers 1 and 4 are considered to be quadratic residues.

Additionally, quadratic residue patterns have interesting properties based upon the value of the prime number p. For odd prime numbers, these numbers can either be 1 mod 4 (where p mod 4 = 1 mod 4 = 1) or 3 mod 4 (where p mod 4 = 3 mod 4 = 3). With these definitions, a URW sampling pattern can be established, with the URW sampling pattern based on quadratic residues being called herein quadratic residue pattern (or QR pattern) and is defined as follows. Let w(i) be the URW sampling pattern of length p (for which w has index values ranging from 0 to p−1). If p≡1 mod 4, then w(0)=0, w(i)=1 if i is a quadratic residue of p, and w(i)=0 otherwise. If p≡3 mod 4, then w(0)=1, w(i)=1 if i is a quadratic residue of p, and w(i)=0 otherwise. FIG. 3 illustrates the binary patterns of a first dozen linear QR patterns.

Figure 4:
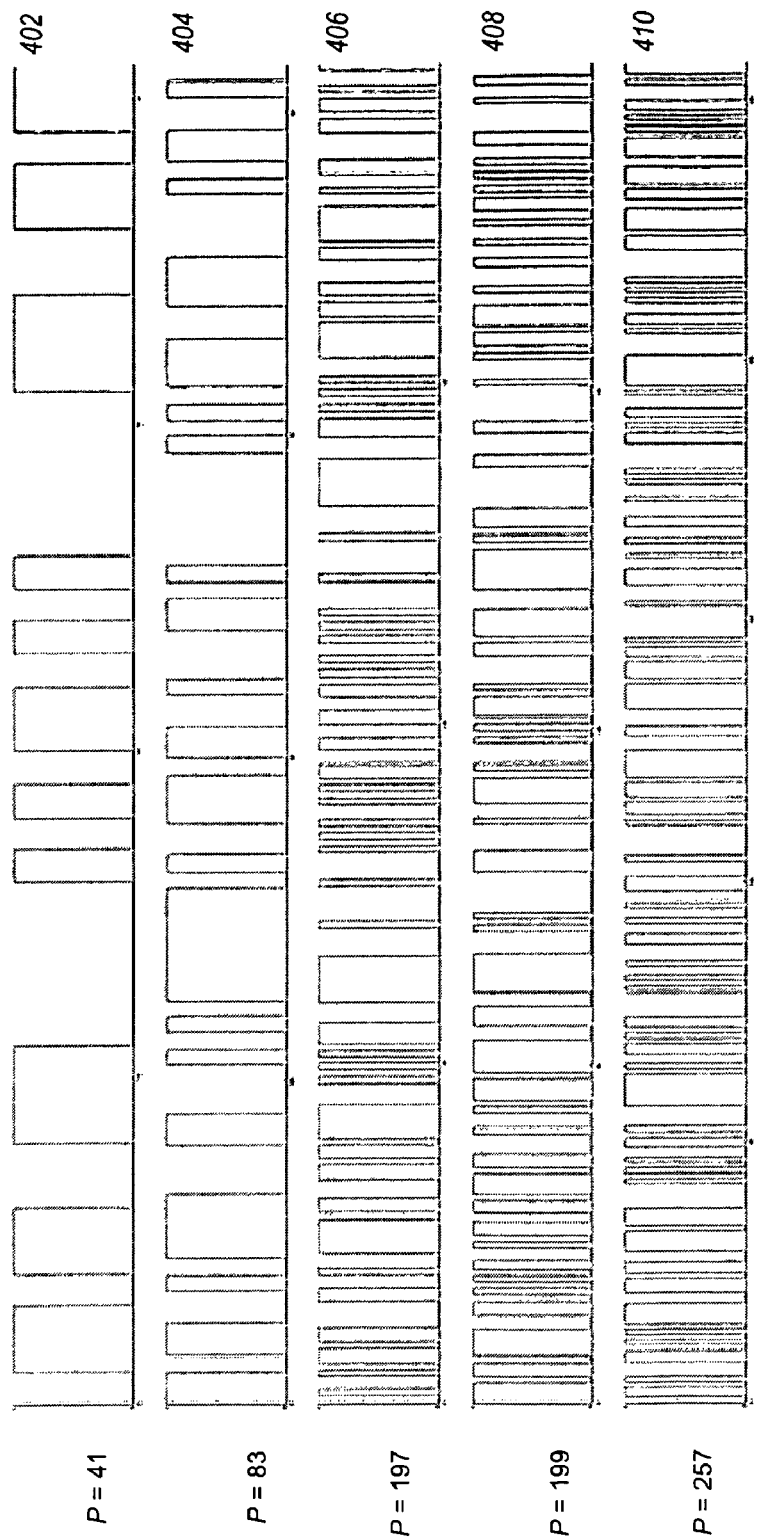
FIG. 4 compares plots of QR patterns, each of a particular sampling pattern length (p), including p=41, p=83, p=197, p=199 and p=257.
Figure 5A:
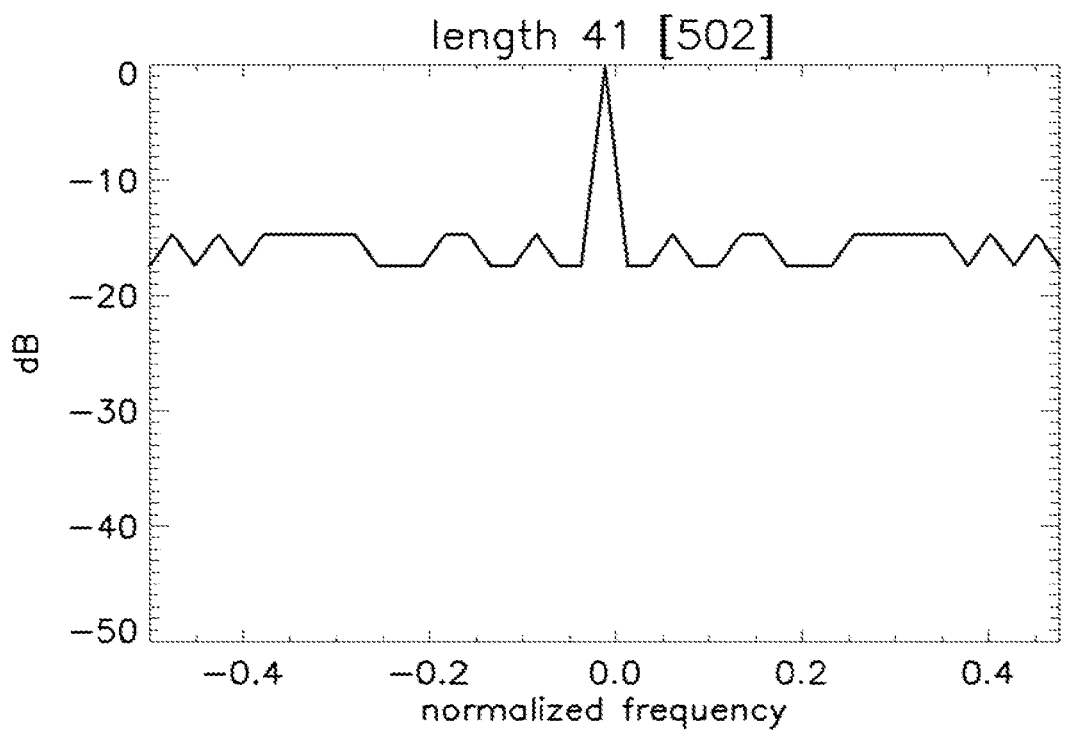
FIGS. 5A-E compare plots of frequency responses for the various lengths of QR patterns of FIG. 4.
Figure 5B:
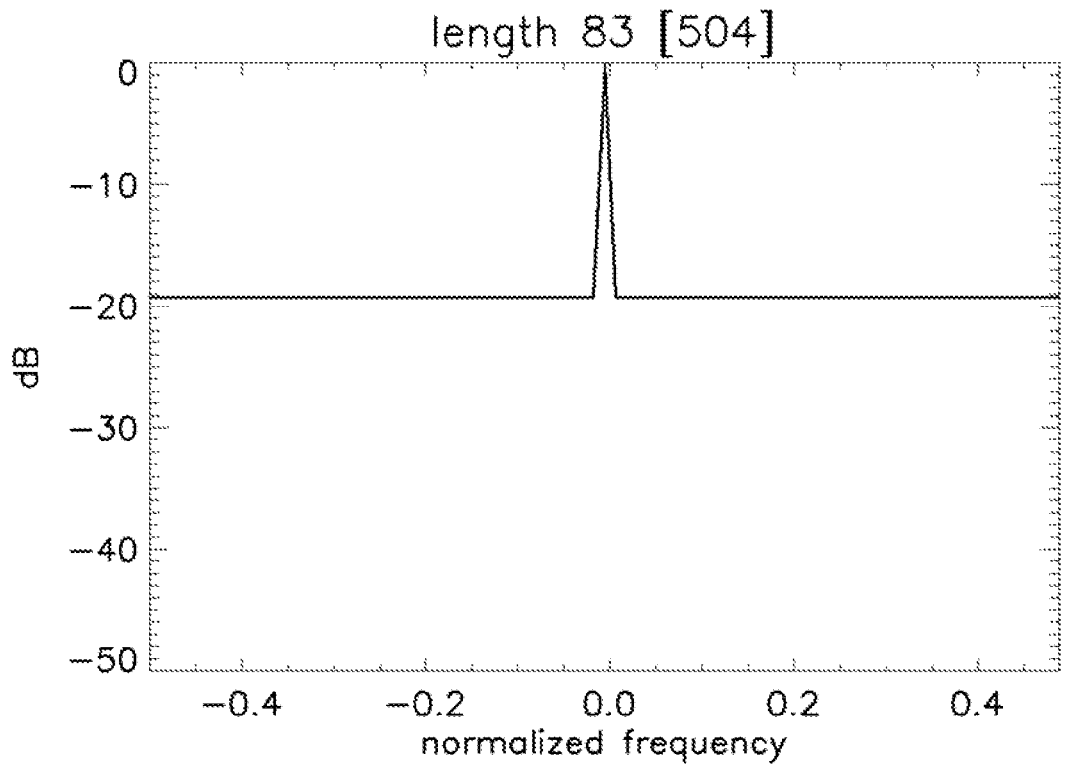
Figure 5C:
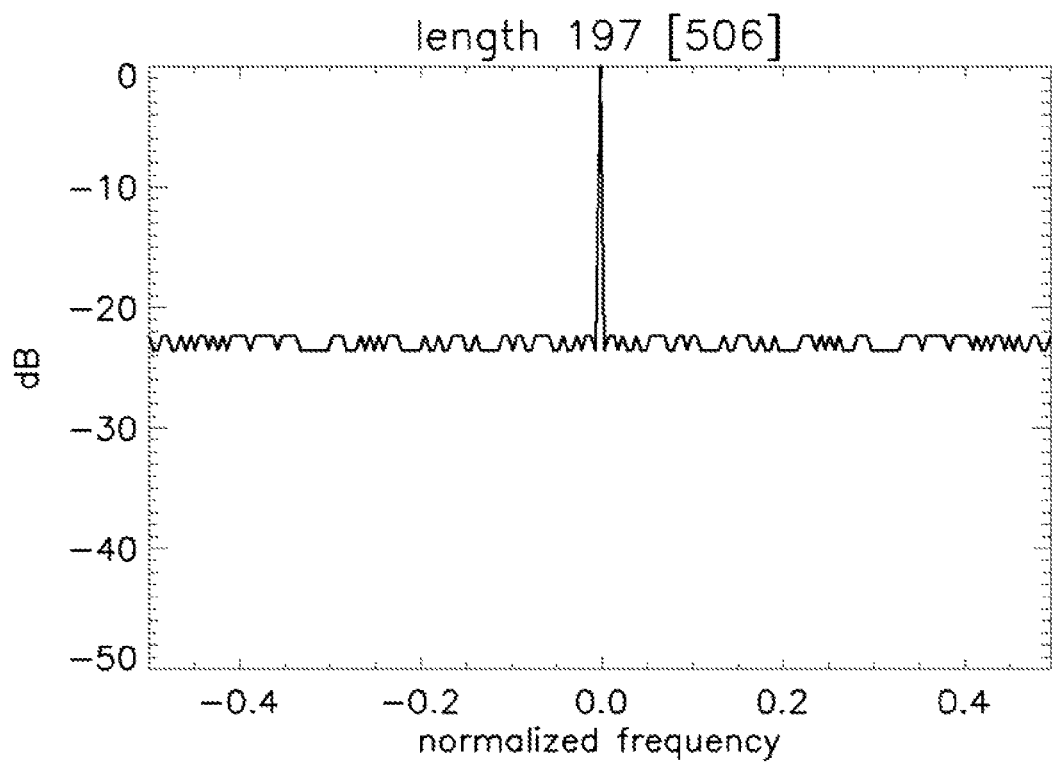
Figure 5D:
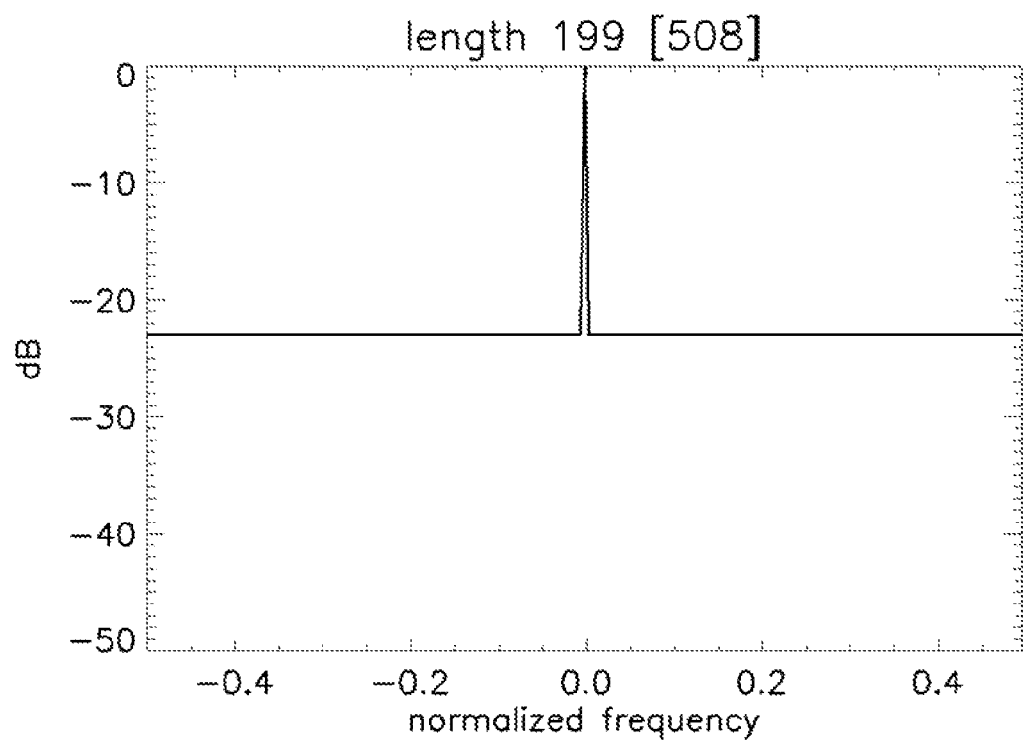
Figure 5E:
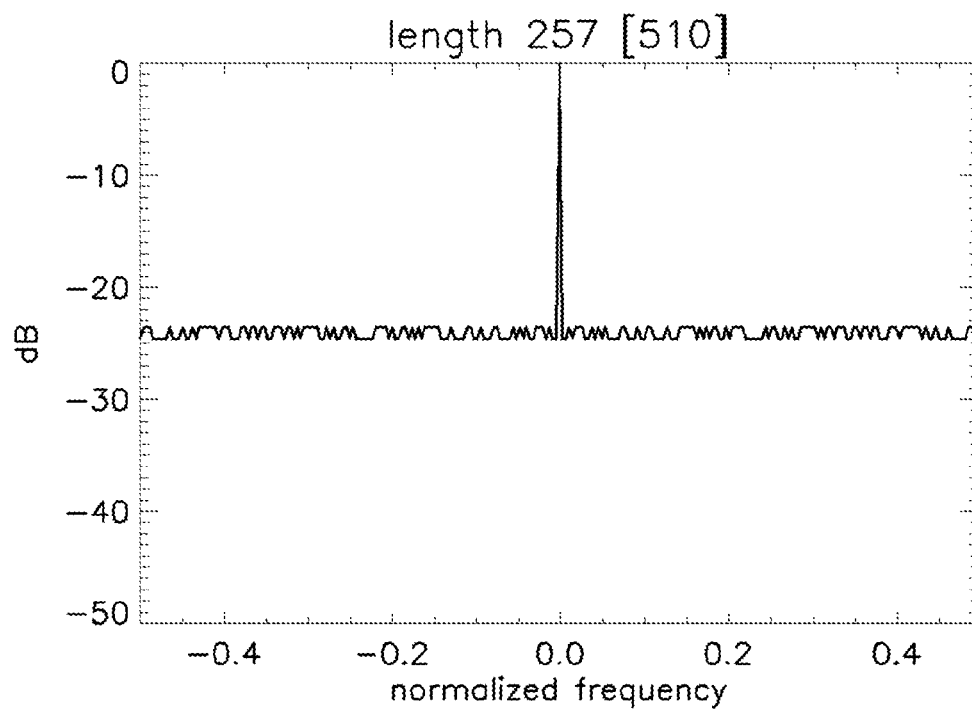

As a property of quadratic residues from number theory, it can be shown that for any odd prime p, there are exactly (p−1)/2 integers that are quadratic residues of p, and therefore exactly (p−1)/2 integers that are not quadratic residues of p (zero is not defined to be either a quadratic residue or not a quadratic residue). Depending on the value of the pattern when i=0, this essentially partitions the sample space into two equal pieces. FIG. 4 compares plots of QR patterns for various lengths, including p=41 (plot 402), p=83 (plot 404), p=197 (plot 406), p=199 (plot 408) and p=257 (plot 410), and the plots of their respective discrete frequency responses are shown in FIGS. 5A-E, including p=41 (plot 502, FIG. 5A), p=83 (plot 504, FIG. 5B), p=197 (plot 506, FIG. 5C), p=199 (plot 508, FIG. 5D) and p=257 (plot 510, FIG. 5E).

Figure 6A:
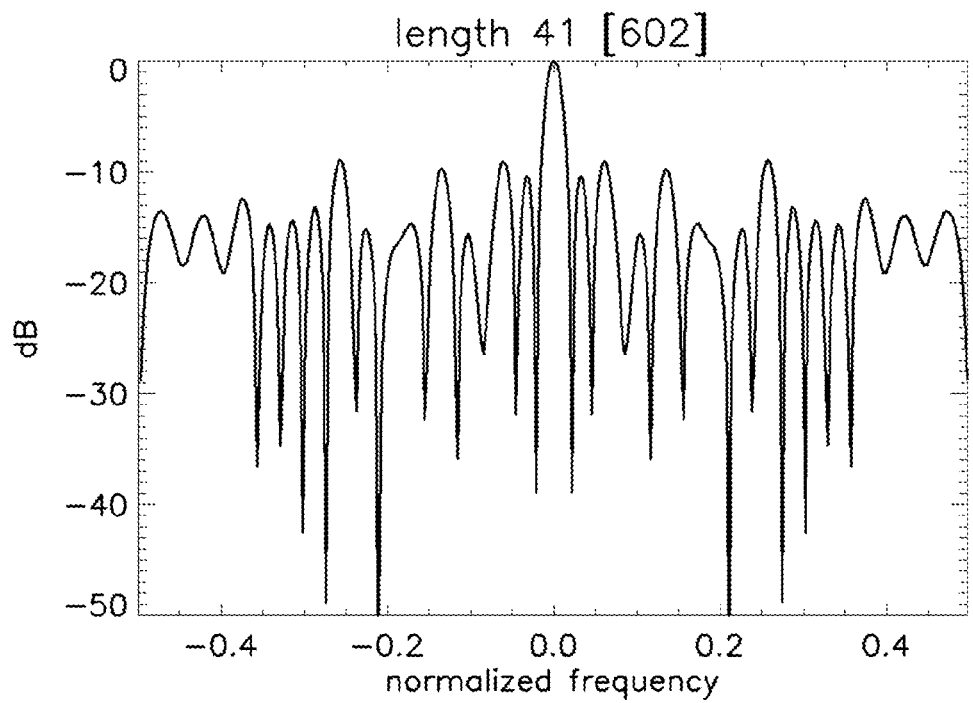
FIGS. 6A-E compare plots of interpolated frequency responses for the various lengths of QR patterns of FIG. 4.
Figure 6B:
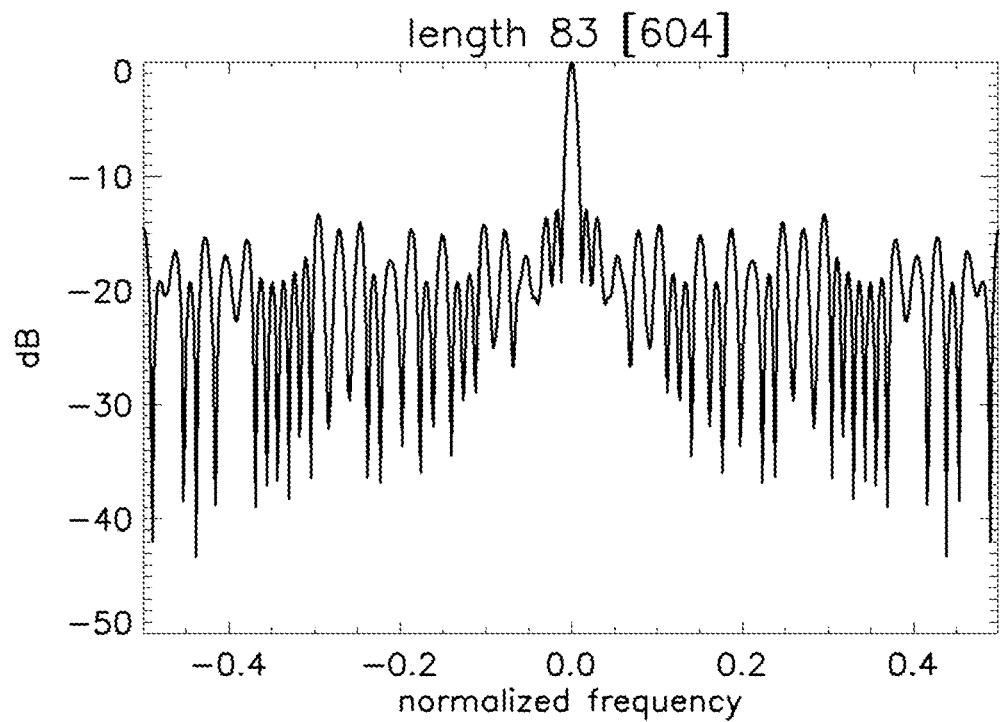
Figure 6C:
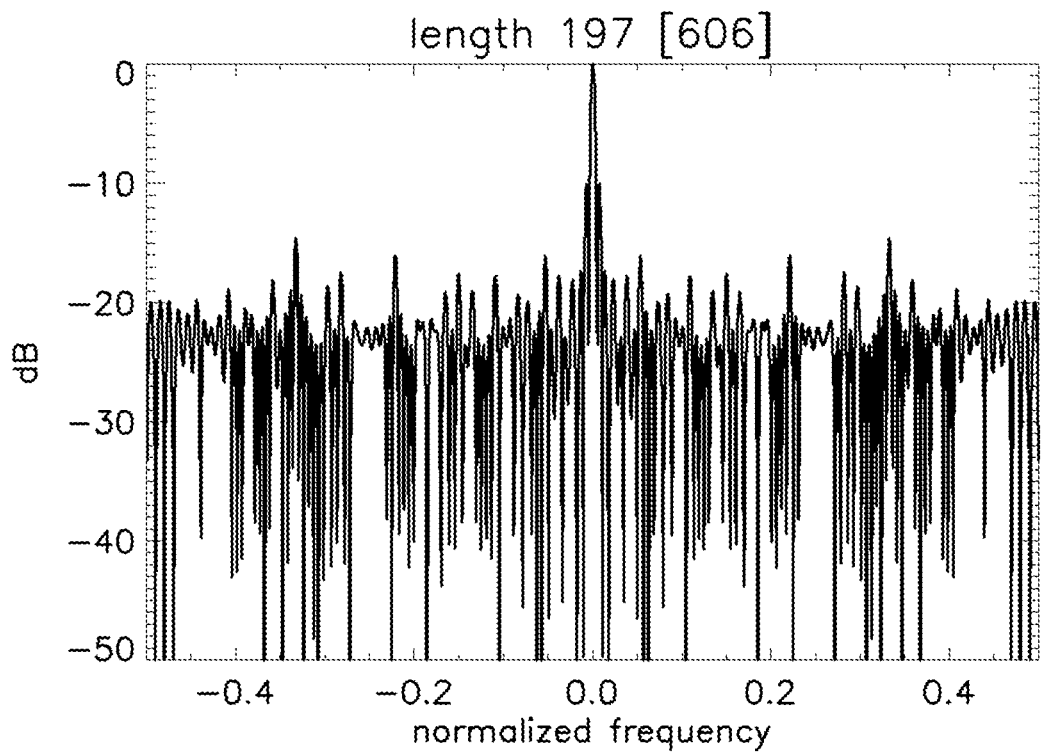
Figure 6D:
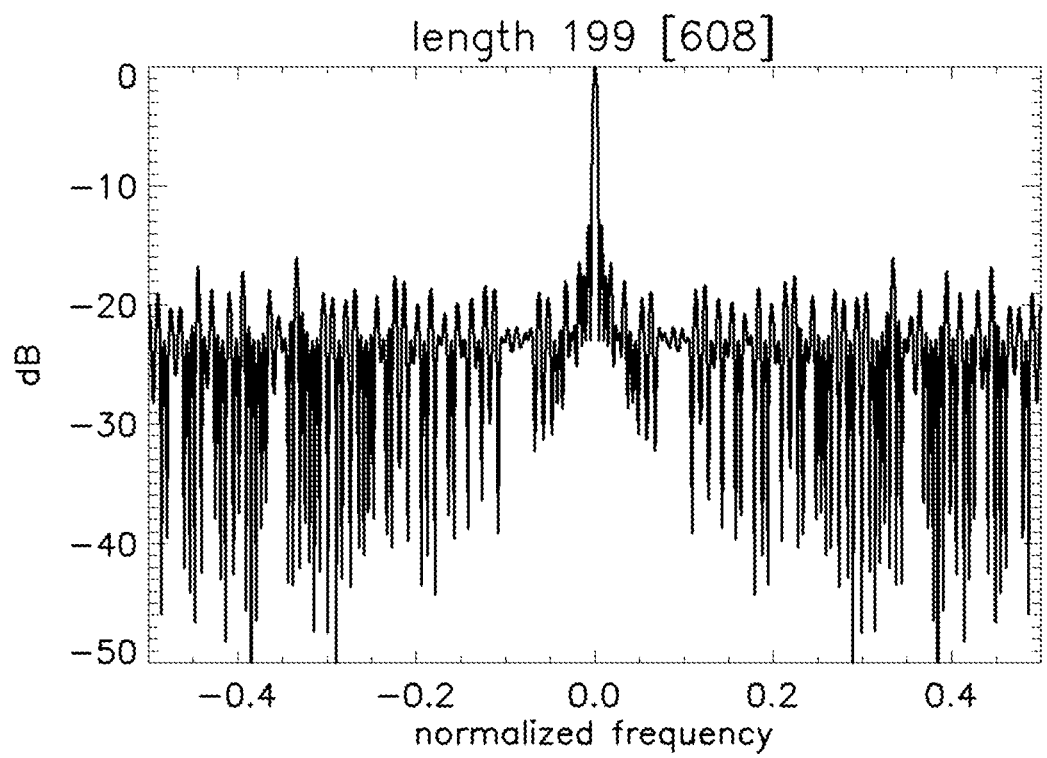
Figure 6E:
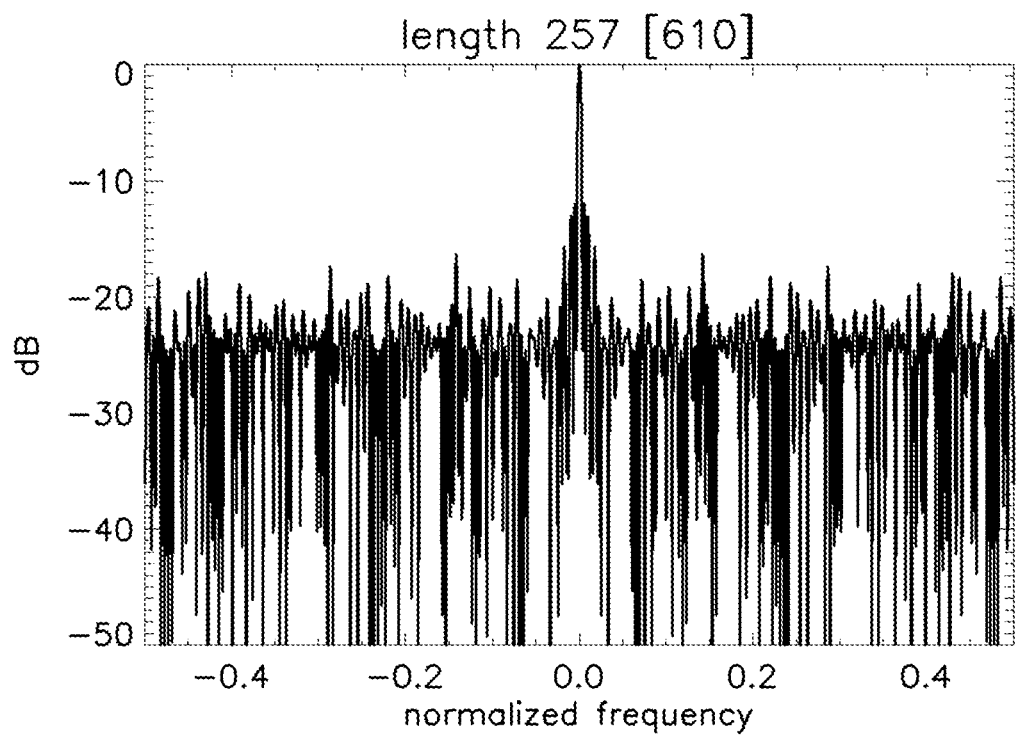

One property of QR patterns that is beneficial for the URW is that QR patterns may have nearly or identically equal sidelobes at discrete frequencies. Depending on the value of p mod 4, the sidelobes may be either nearly flat (p≡1 mod 4) or perfectly flat (p≡3 mod 4), as can be seen in FIGS. 5A-E. Though QR patterns of length p≡3 mod 4 may be flat when sampled discretely, the plots of the oversampled frequency responses contained in FIGS. 6A-E, which contain plots of interpolated frequency responses for QR patterns of various lengths, including p=41 (plot 602, FIG. 6A), p=83 (plot 604, FIG. 6B), p=197 (plot 606, FIG. 6C), p=199 (plot 608, FIG. 6D) and p=257 (plot 610, FIG. 6E), illustrate that QR patterns of length p≡1 mod 4 also have relatively flat sidelobes.

Looking again at the frequency plots, the QR pattern seems to be the perfect balance between sidelobe level and main peak width. In fact, the description of the QR pattern above demonstrates that the main peak width may be the same width as the full pattern, while the sidelobes are relatively flat.

Figure 7A:
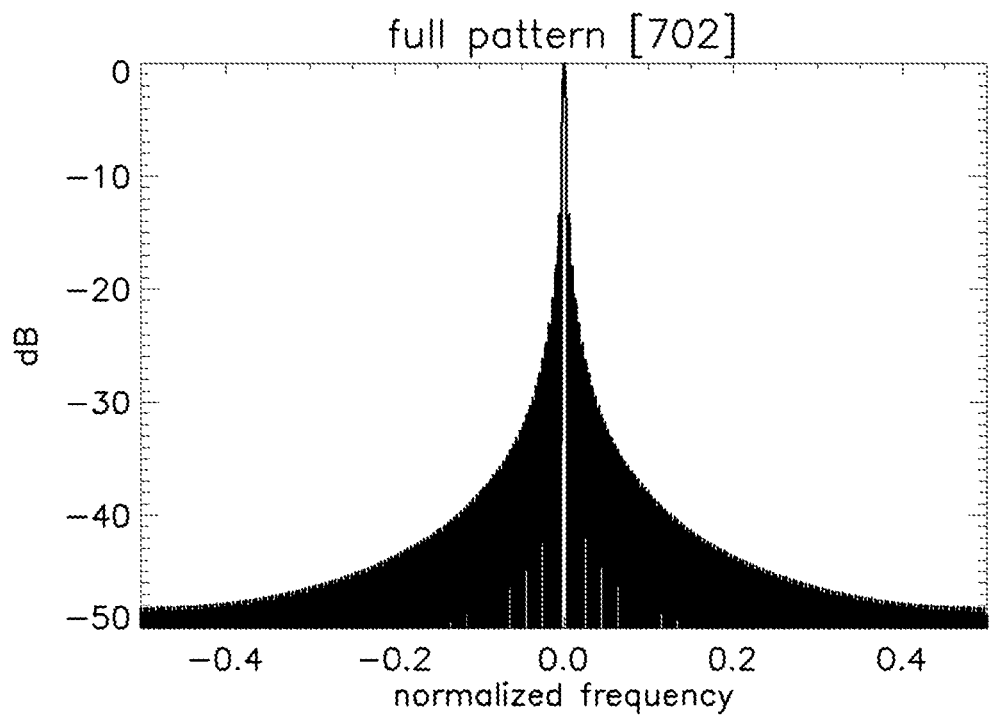
FIGS. 7A-E compare plots of interpolated frequency responses for various URW sampling patterns of length 257, including a full pattern, a first-half pattern, an alternating pattern, a QR pattern, and a pseudo-random pattern.
Figure 7B:
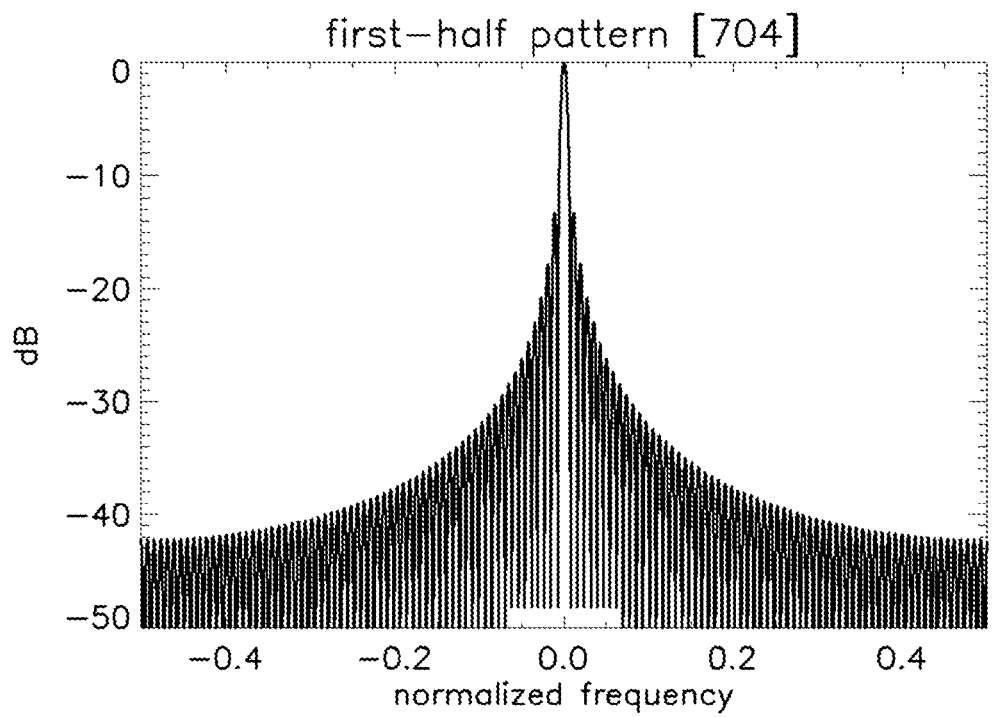
Figure 7C:
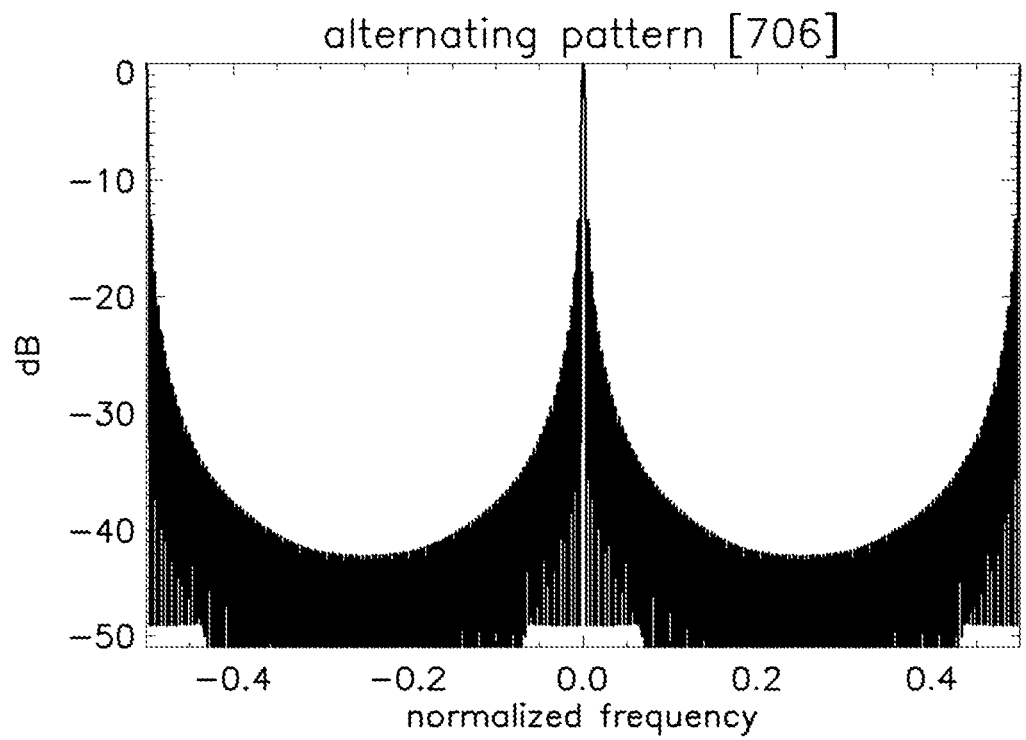
Figure 7D:
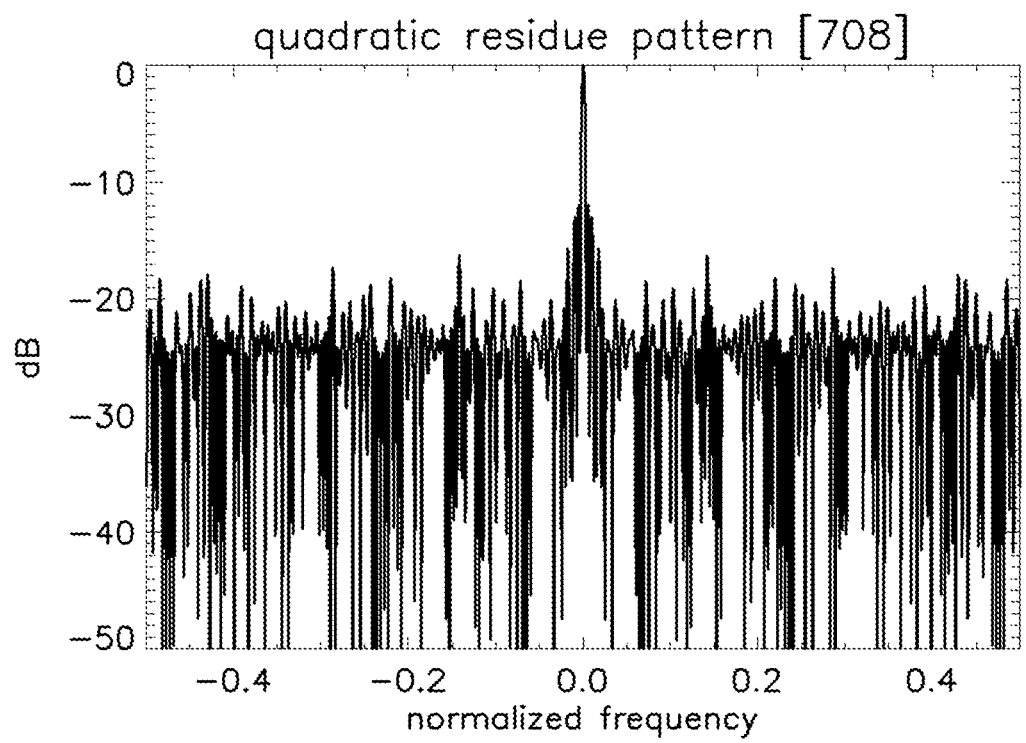
Figure 7E:
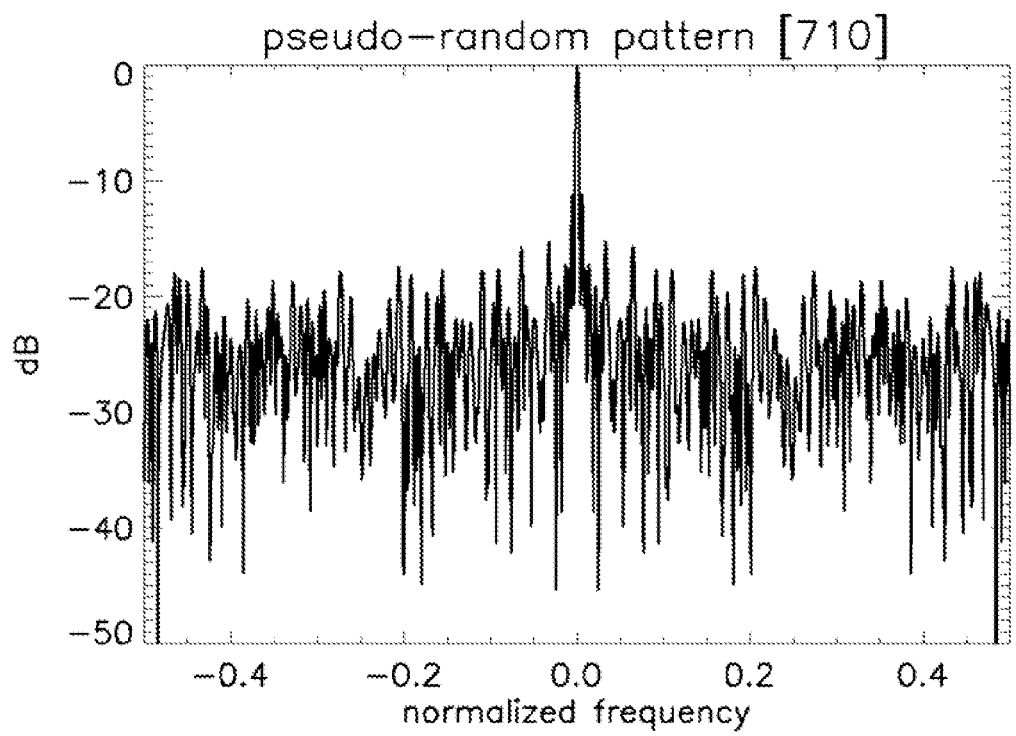
Figure 8A:
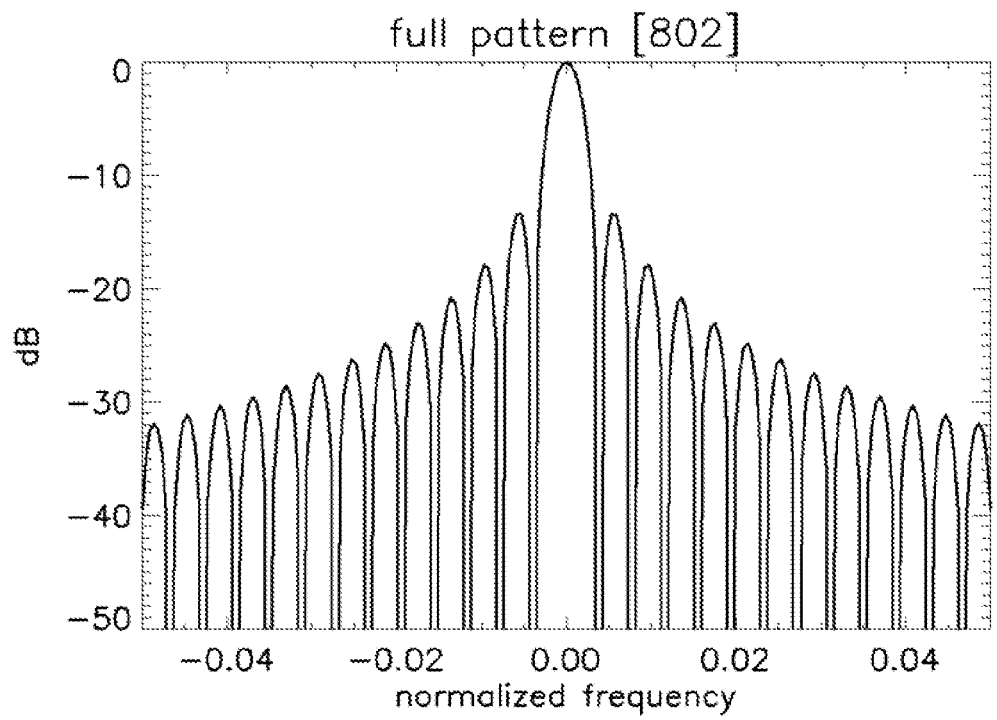
FIGS. 8A-E compares zoomed plots (showing the details of the main lobe) of frequency responses for the various sampling patterns of FIG. 7.
Figure 8B:
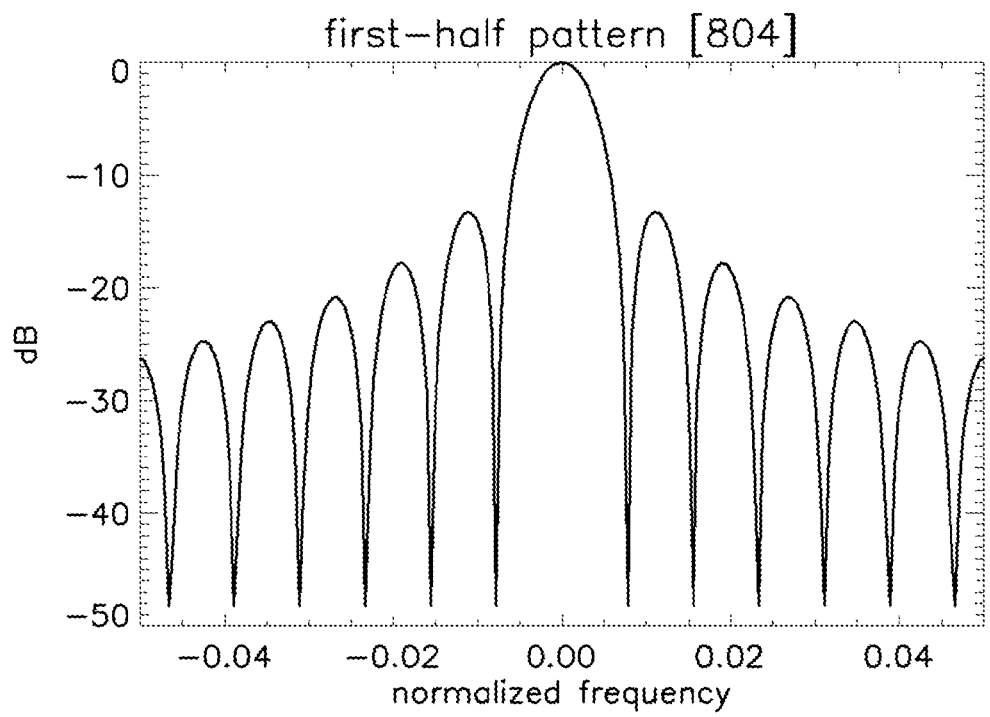
Figure 8C:
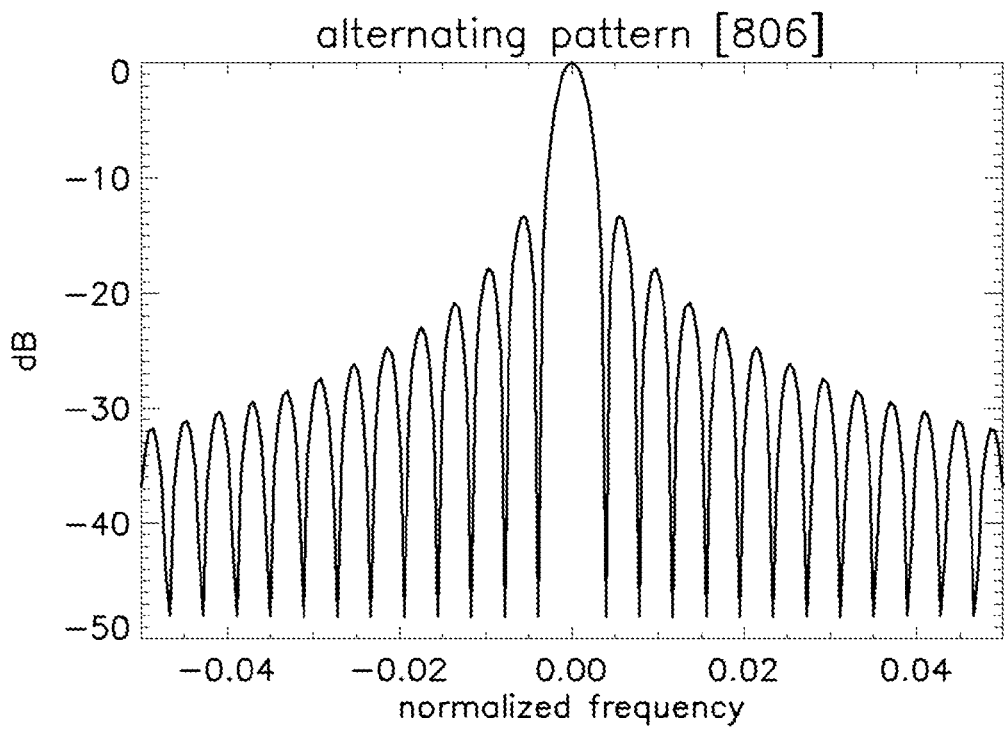
Figure 8D:
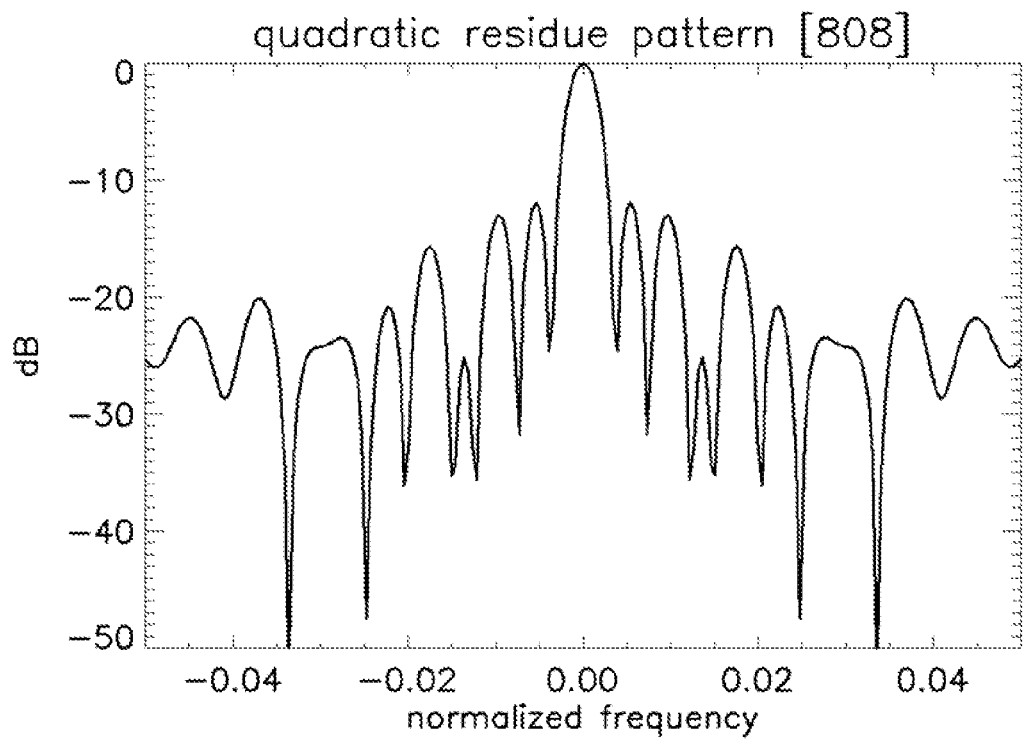
Figure 8E:
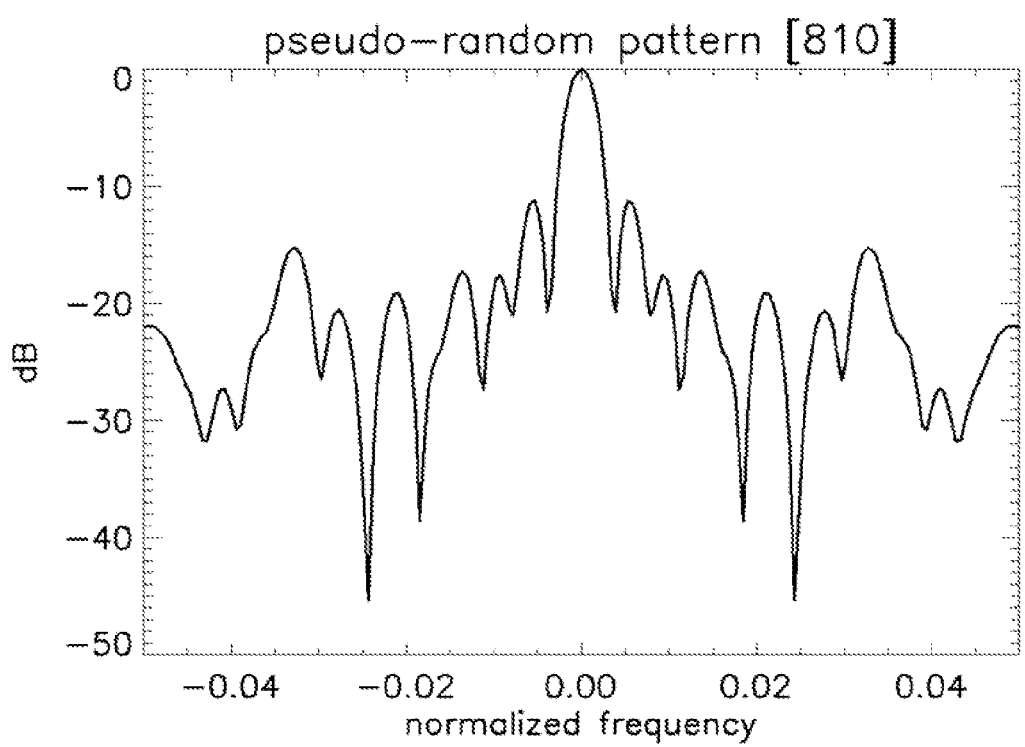

FIGS. 7A-E contain plots of the interpolated frequency responses for the following sampling schemes of length 257: full pattern (plot 702, FIG. 7A), first-half pattern (plot 704, FIG. 7B), alternating pattern (plot 706, FIG. 7C), quadratic residue pattern (plot 708, FIG. 7D), and pseudo-random pattern (plot 710, FIG. 7E). FIGS. 7A-E show the full frequency range, while FIGS. 8A-E contain close-up plots of the main peak and the first few sidelobes of the frequency response for the same sampling patterns of length 257: full pattern (plot 802, FIG. 8A), first-half pattern (plot 804, FIG. 8B), alternating pattern (plot 806, FIG. 8C), quadratic residue pattern (plot 808, FIG. 8D), and pseudo-random pattern (plot 810, FIG. 8E). The frequency response plots of the length 257 patterns in FIGS. 7A-E can be compared to the length 41 patterns in FIGS. 2A-E.

Another consideration for uneven sampling may come from the idea of random or pseudo-random patterns covering the desired fraction of radar pulses. The frequency response of such patterns may have a narrow main peak width and low sidelobe levels. While these properties may not be achieved by all random patterns nor quite as well as the QR patterns, the flexibility of designing uneven sampling patterns of arbitrary length and fraction of pulses may make such patterns useful.

Figure 9:
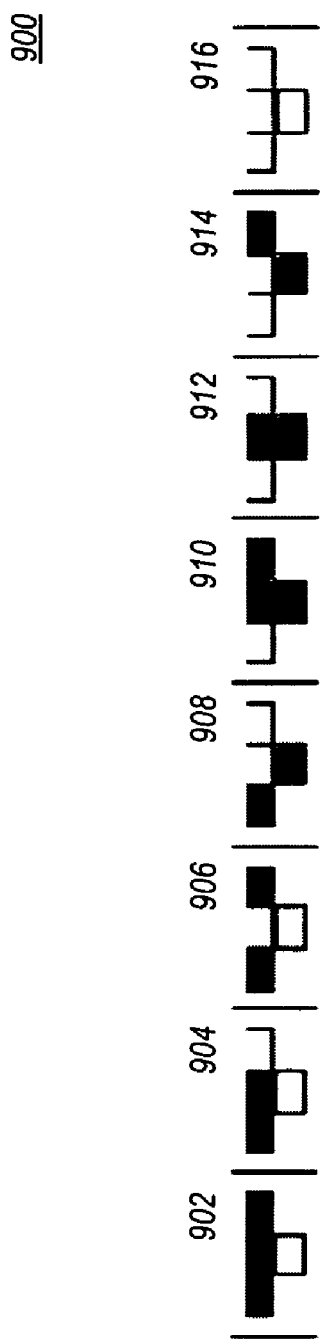
FIG. 9 is a plot of a Rule 30 update function for a cellular automaton-based pseudo-random number generator.

One approach for implementing a pseudo-random generator is a cellular automaton-based generator. A cellular automaton may be a rules-based computational network comprised of connected elements in the form of an array, where each cell may compute an output state as a function of its inputs and a computational rule set. In a one-dimensional cellular automaton of radius 1, a cell in the network may compute its output state based upon inputs of itself and the two nearest cells along a single one-dimensional line. All cells in the array may be updated simultaneously, and the updated value of the cell at the next time step may be a function of the inputs from the previous time step. FIG. 9 illustrates a plot 900 of a Rule 30 update function, where a white cell represents that the cell value is equal to "0" and a black cell represents that the cell value is equal to "1." The output state of the cell is provided at the bottom as a function of the configuration of input cells.

For example, reviewing the first section 902 of the plot 900, if the cell has a value of "1" and each of its neighbors also has a value of "1," then the updated value of the cell would be "0." Since there are three inputs, each having possible values of "0" and "1," there are $2^3$ or 8 possible input configurations. The update function or "rule" defines the output states that occur in the presence of each possible input configuration. The rule numbering system is defined as the base 10 number represented by the binary output string above –00011110=30.

Figure 10:
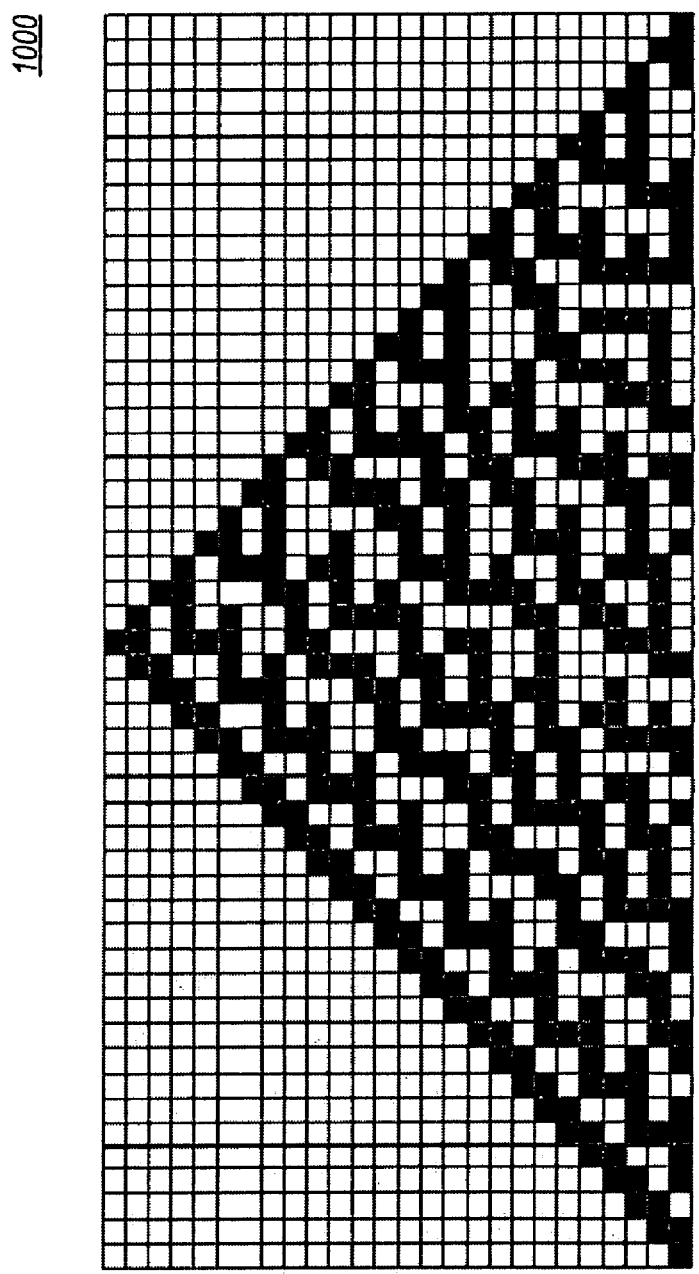
FIG. 10 illustrates a 50 step update of the Rule 30 cellular automaton of FIG. 9.
Figure 11A:
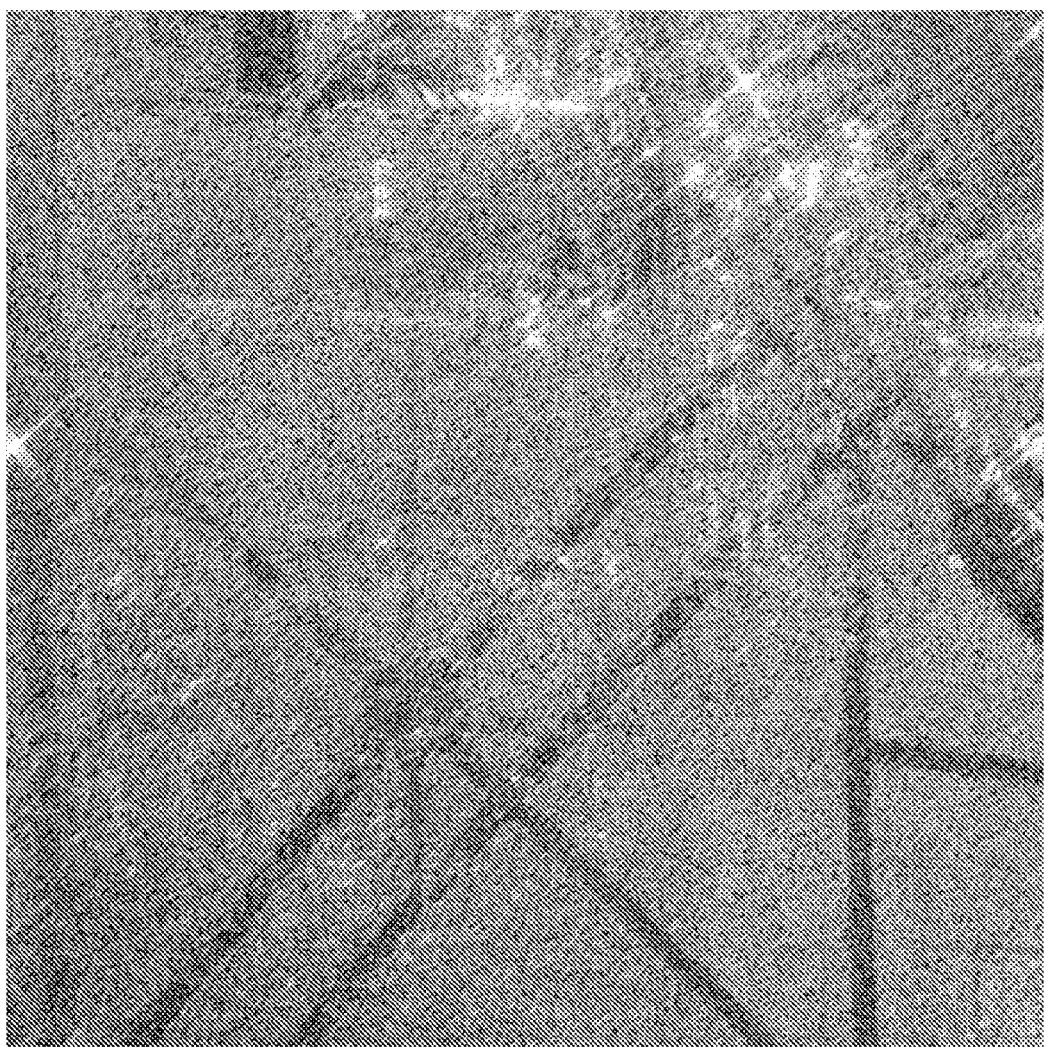
FIGS. 11A-D compare synthetic aperture radar (SAR) images obtained using various subaperture sampling patterns of length 41, including full pattern, first-half pattern alternating pattern, and quadratic residue pattern.
Figure 11B:
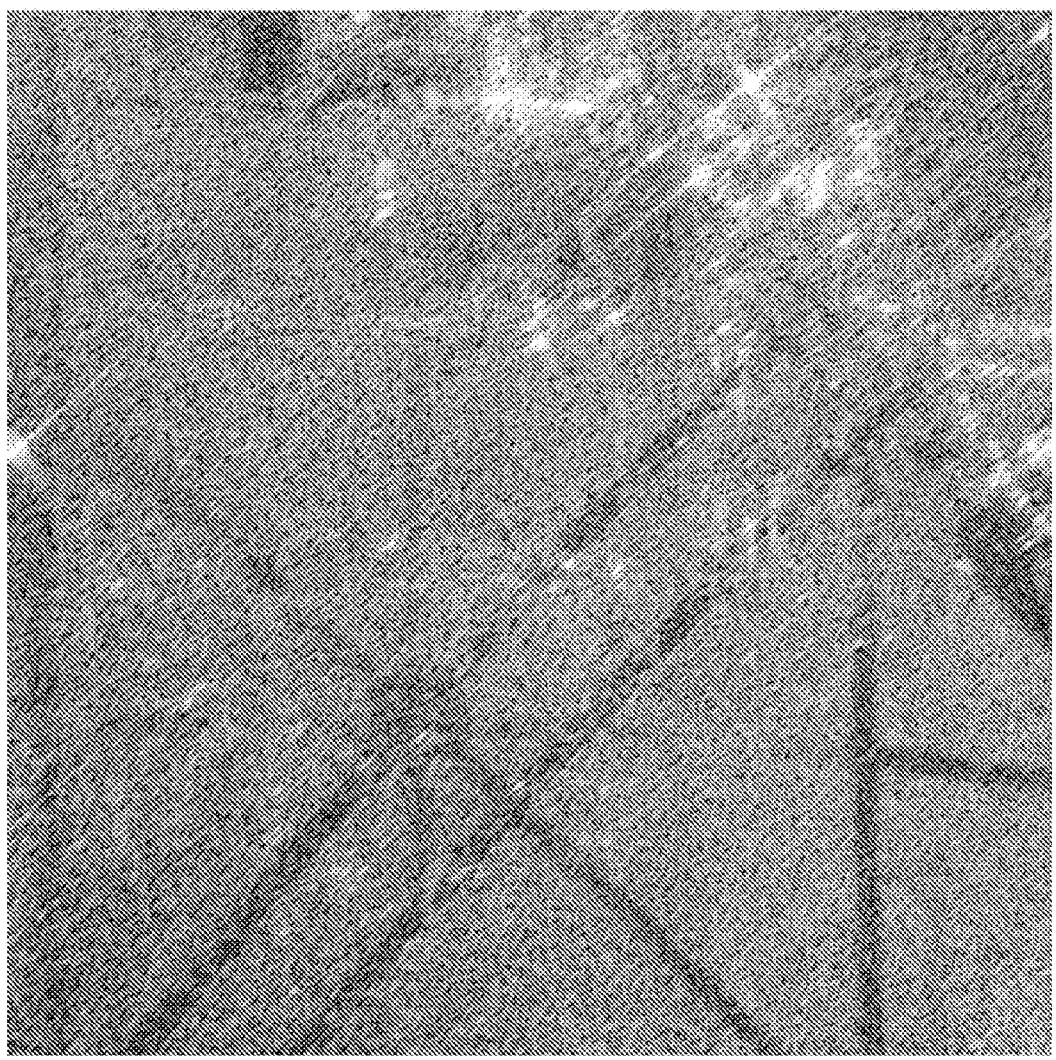
Figure 11C:
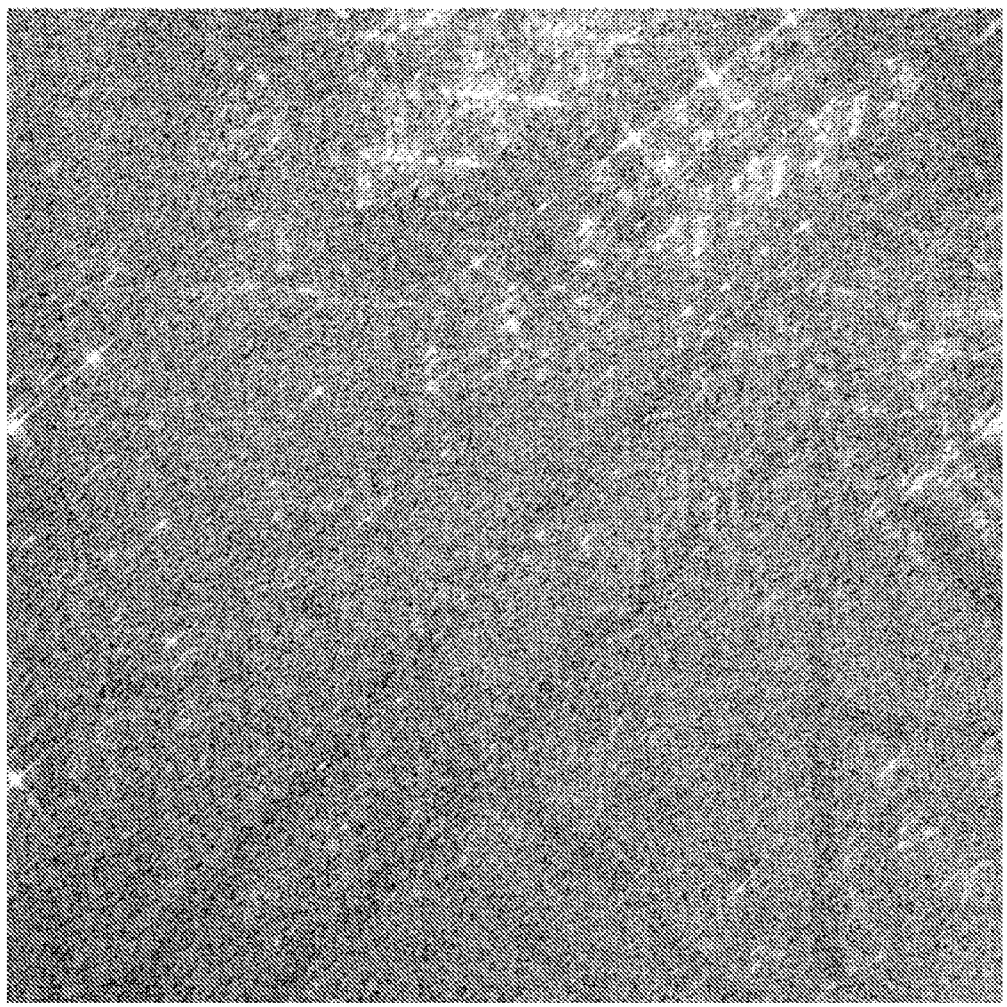
Figure 11D:
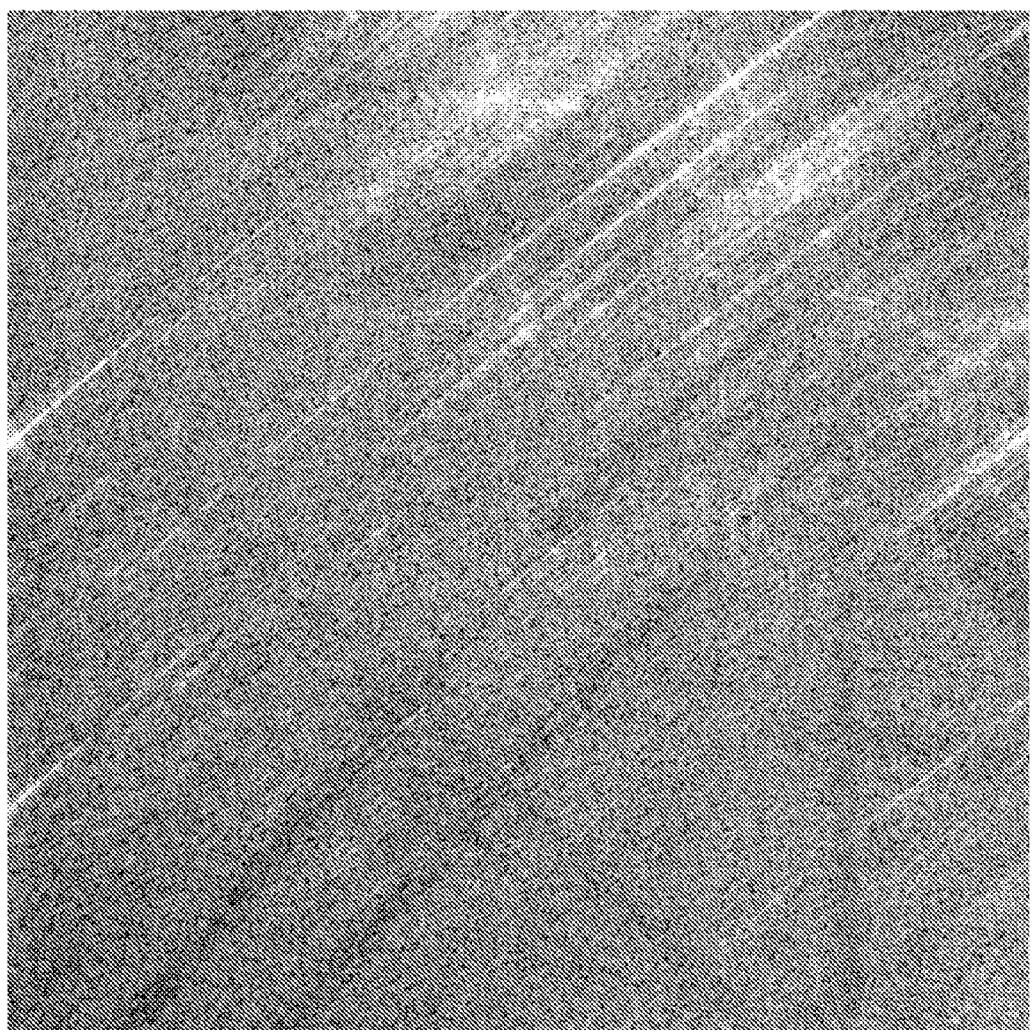

Time evolution of the Rule 30 cellular automata network may yield random properties which can be used to generate pseudo-random numbers having beneficial URW properties. FIG. 10 illustrates a 50 cell array 1000 with a time evolution of 25 updates using Rule 30 cellular automaton. The random number sequence used for URW sampling is taken from the center column of this evolution. The frequency plots of the Rule 30 patterns of length 257 are shown in FIGS. 8A-E and 7A-E.

The goal of achieving high quality radar output data (e.g., for high resolution SAR images) using fewer radar pulses may require a number of signal processing advancements. Consider first the case of halving the number of radar pulses (which would allow for simultaneous imaging of two disparate areas, for example). FIGS. 11A-D illustrate SAR images obtained using 32 pulses per subaperture, with subaperture sampling patterns of length 41 including a full pattern (image 1102, FIG. 11A), a first-half pattern (image 1104, FIG. 11B), an alternating pattern (image 1106, FIG. 11C) and a QR pattern (image 1108, FIG. 11D). The final three images (1104, 1106, 1108, FIGS. 11B-D) are generated using approximately one-half of the pulses used for first image (1102, FIG. 11A).

A number of non-ideal solutions to the problem will be described herein and shown with phase history data in FIGS. 11A-D to describe the motivation behind URW and illustrate certain improvements achieved by the techniques disclosed herein. The test data being used comes from an image that has two corner reflectors (at the left edge and the upper right portion of the image) in addition to a few other bright reflectors, as well as some low cross-section road-like or runway-like features.

One approach to generate SAR imagery with half the number of radar pulses may be to reduce the dwelling of the radar platform over the target by a factor of two. Because, in this case, the image resolution may be proportional to the temporal aperture used for coherent integration, the image may have a coarser resolution (by the same factor of two). In addition, the sidelobe peaks may be visible in that image and the low cross-section targets may be slightly less well resolved.

One alternative may be to use alternating pulses—spread the pulses out evenly over the same temporal aperture. Unfortunately, this pattern may have a frequency response that has a large secondary peak near Nyquist frequency. This may indicate that strong scatterers from frequencies near the Nyquist frequency will also be seen at zero frequency, which may create ghost images of the same corner reflector in the respective SAR image. The large sidelobes of the alternating pattern frequency response also almost completely blur the low cross-section features.

Unfortunately, as illustrated in FIGS. 11A-D, the image quality achieved using a QR pattern of length 41 may be poor because the low difference in levels of the sidelobes relative to the main lobe (also referred to as the dynamic range of the sampling pattern) blurs both the high and low cross-section targets in the image. Using any of these sampling patterns inside each of subapertures (instead of uneven sampling on the subaperture level) may have deleterious effects on image quality as predicted by the frequency responses of those patterns.

Figure 12A:
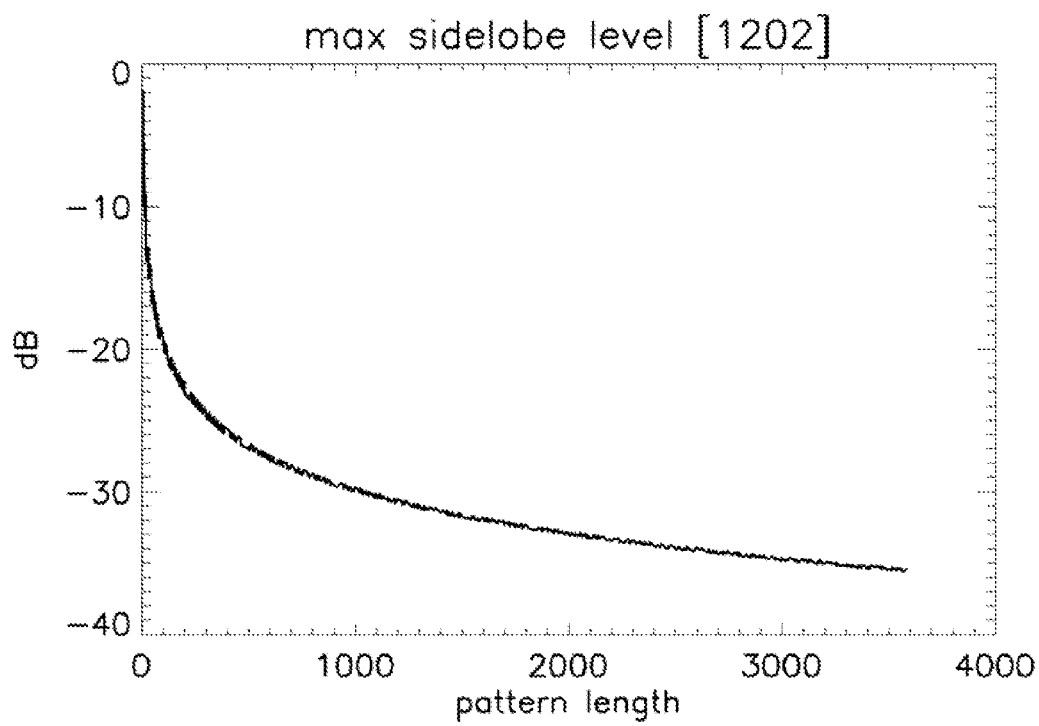
FIGS. 12A-B show a plot of a maximum sidelobe level of a QR pattern as a function of pattern length as compared to a plot of a mean sidelobe level.
Figure 12B:
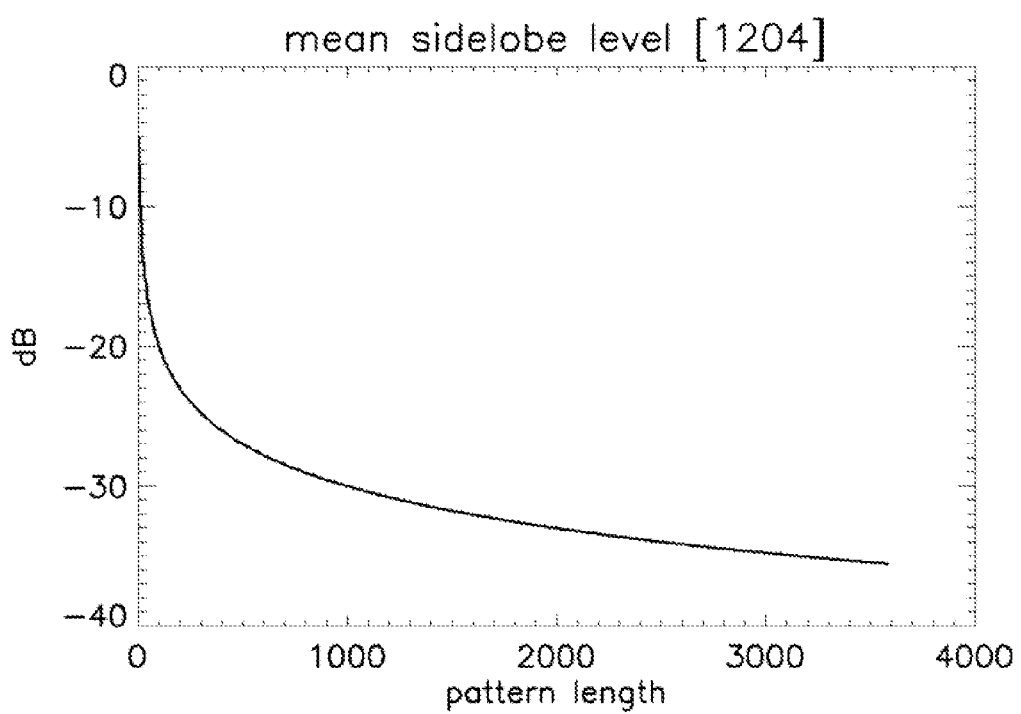

There may be little that can be done to improve the inherent sidelobe levels of a 50% sampling pattern, other than make the sidelobe pattern relatively flat and the main peak width as narrow as possible—the QR sampling pattern tends to achieve this best. Increasing the length of the QR pattern may improve the sidelobes gradually, as seen in FIGS. 12A-B, illustrating a plot 1202 (FIG. 12A) of the maximum sidelobe level of the QR pattern as a function of pattern length as well as a plot 1204 (FIG. 12B) of mean sidelobe level as a function of pattern length. Changing the sampling or adding complex weights to the pattern may not significantly improve the pattern's effects on the generated SAR imagery. However, in accordance with one approach, a correction algorithm can be applied to correct for the sampling pattern effects. This is described further herein.

To correct for the effects of a URW sampling pattern, known properties of the sampling pattern and their propagated effects may be leveraged in the decoding process. For example, the QR pattern (and the pseudo-random pattern) may have a narrow main lobe, which implies that what is observed in the Doppler spectrum at a particular frequency may be predominately the result of energy at that frequency and little energy for other frequencies. This may provide a level of confidence that strong scatterers in a SAR image constructed with a QR pattern will be well resolved and will not be significantly corrupted from energy elsewhere in the image.

Figure 13A:
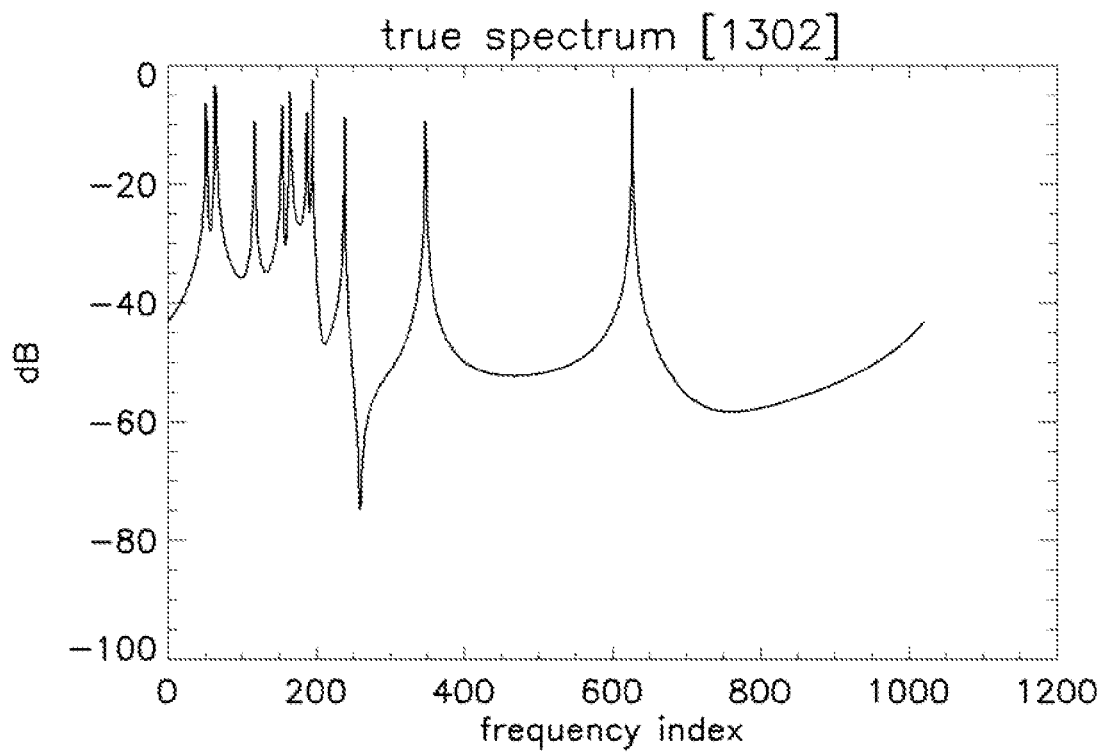
FIGS. 13A-C compare plots of true spectrum of a test data, approximation to the true spectrum, and corresponding error of the approximation to the true spectrum.
Figure 13B:
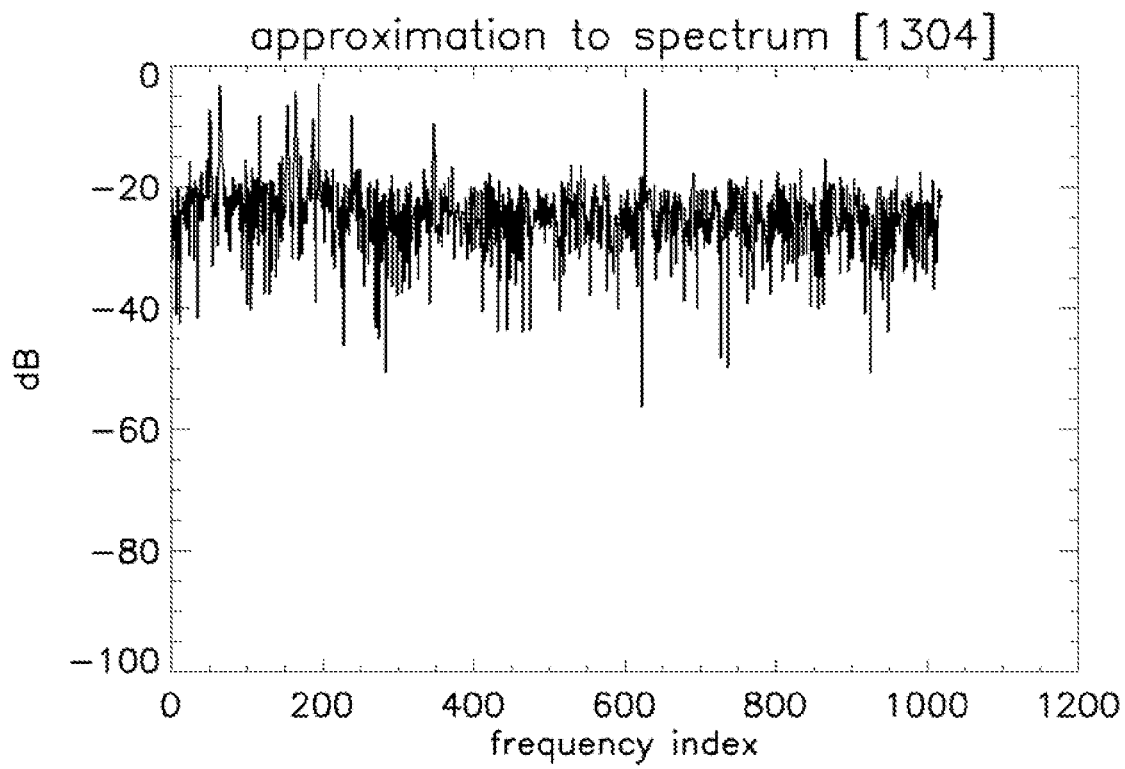
Figure 13C:
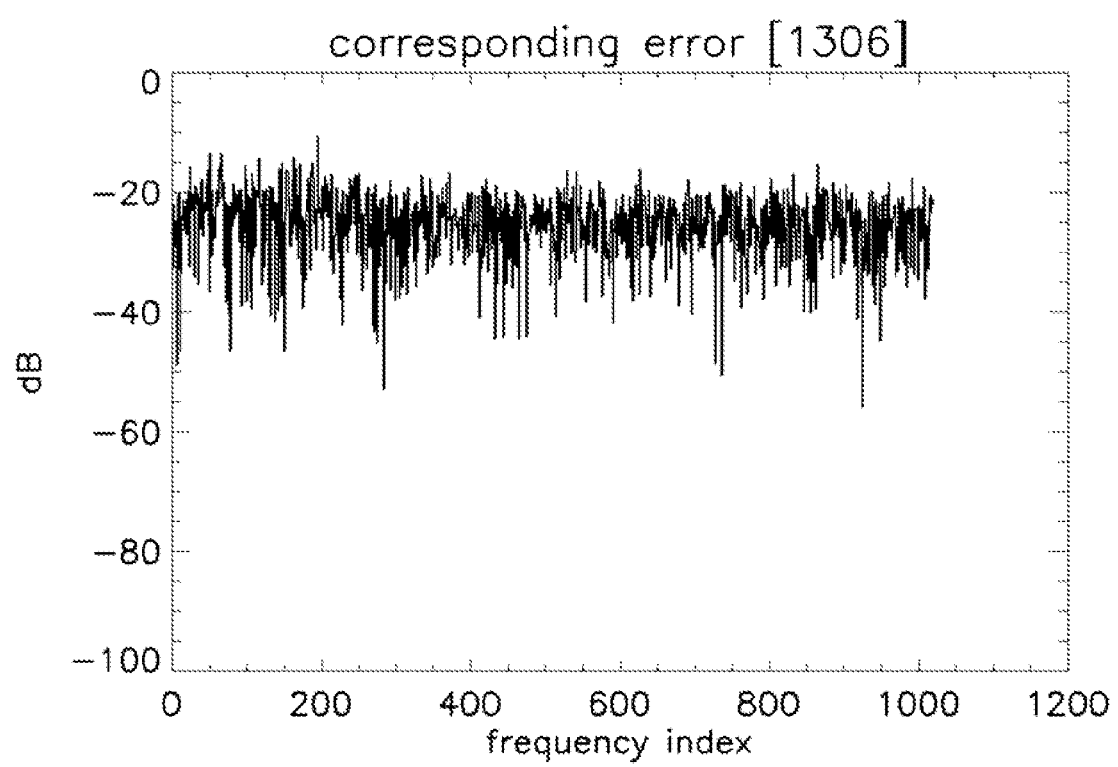

Using this fact, a reasonable confidence level may be reached as to how the energy of this complex scatterer will propagate through the SAR imaging process via the sampling pattern response. Those skilled in the art will recognize propagation patterns and effects of other sampling patterns. In any event, iterative correction for complex scatterers may be used to remove the blurring effects observed in previous figures and resulting in a SAR image with better quality. To illustrate the motivation behind this process, first consider an example of approximating a spectrum consisting of ten discrete delta functions, whose periodogram is shown in FIGS. 13A-C, illustrating a true spectrum of test data (plot 1302, FIG. 13A), an approximation to the true spectrum when sampled using length 1021 QR pattern (plot 1304, FIG. 13B), and the corresponding error (plot 1306, FIG. 13C). When a representative time series is sampled unevenly, like the QR whose frequency response is shown in plot 1304 (FIG. 13B), the resulting periodogram straightforwardly constructed from half of the time measurements may be far inferior. Without additional processing, much of the true spectral energy may be spread into other frequencies.

Still, each of the ten peaks can be discerned in the length 1021 QR spectral approximation, because they are visible within the dynamic range limitations of the sampling pattern. Taking into account the sampling effects, iterating over individual peaks or groups of peaks that are detected above a predetermined threshold related to the sampling pattern dynamic range, a much better approximation to the spectrum may be obtained.

Figure 14:
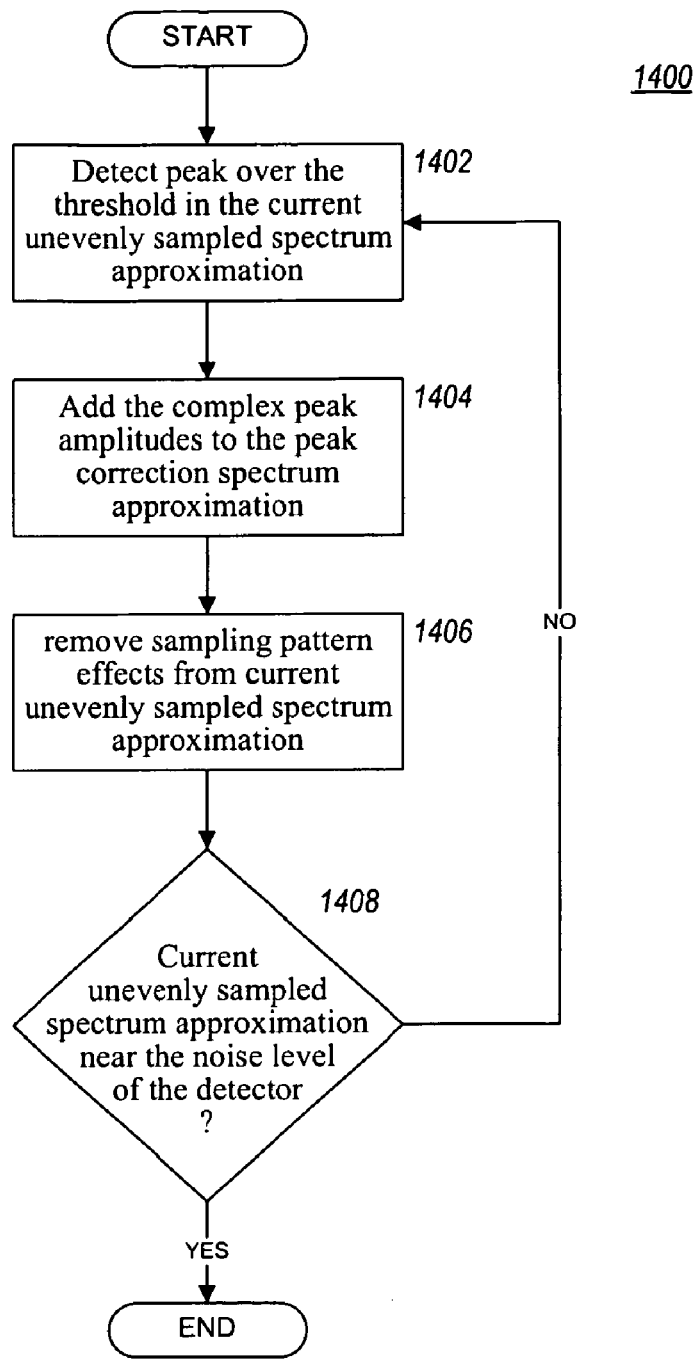
FIG. 14 is a flow diagram illustrating a peak correction process.
Figure 15A:
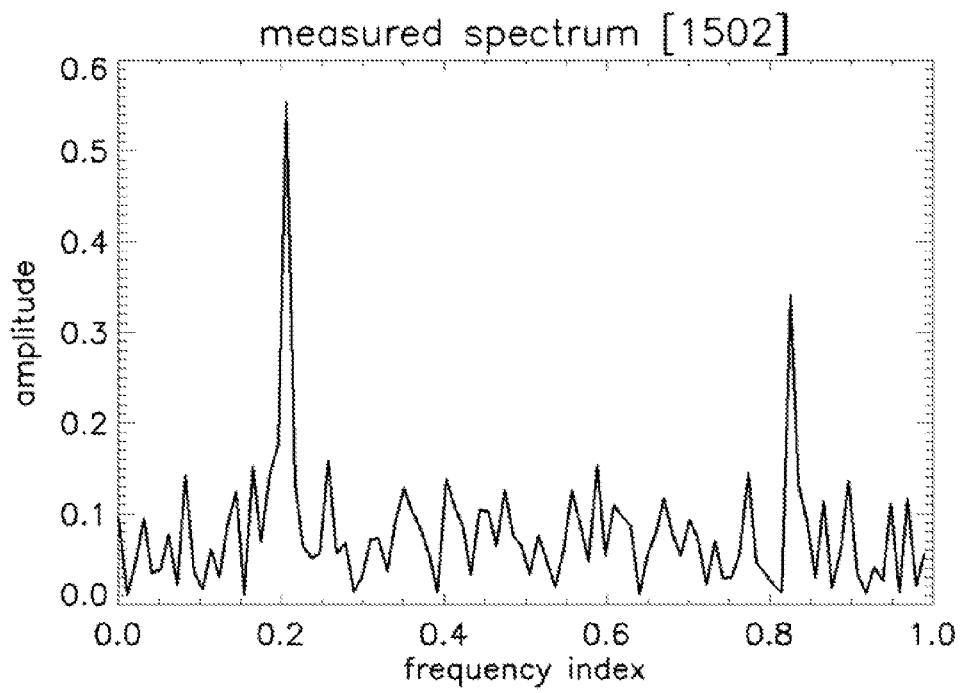
FIGS. 15A-C are a compilation of plots illustrating the operation of the peak correction process of FIG. 14.
Figure 15B:
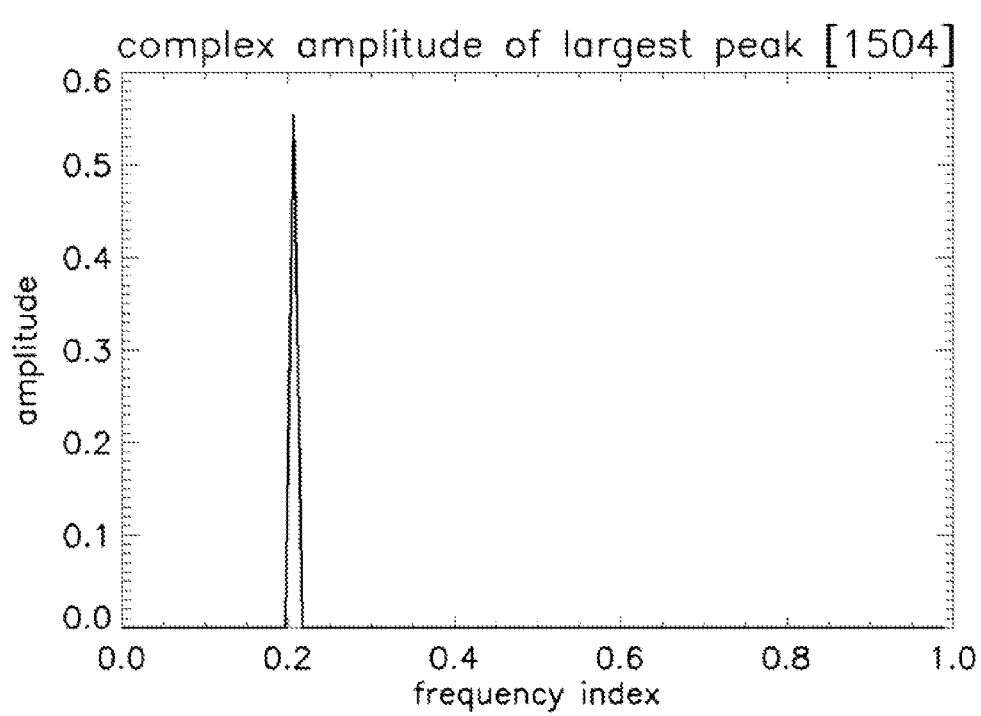
Figure 15C:
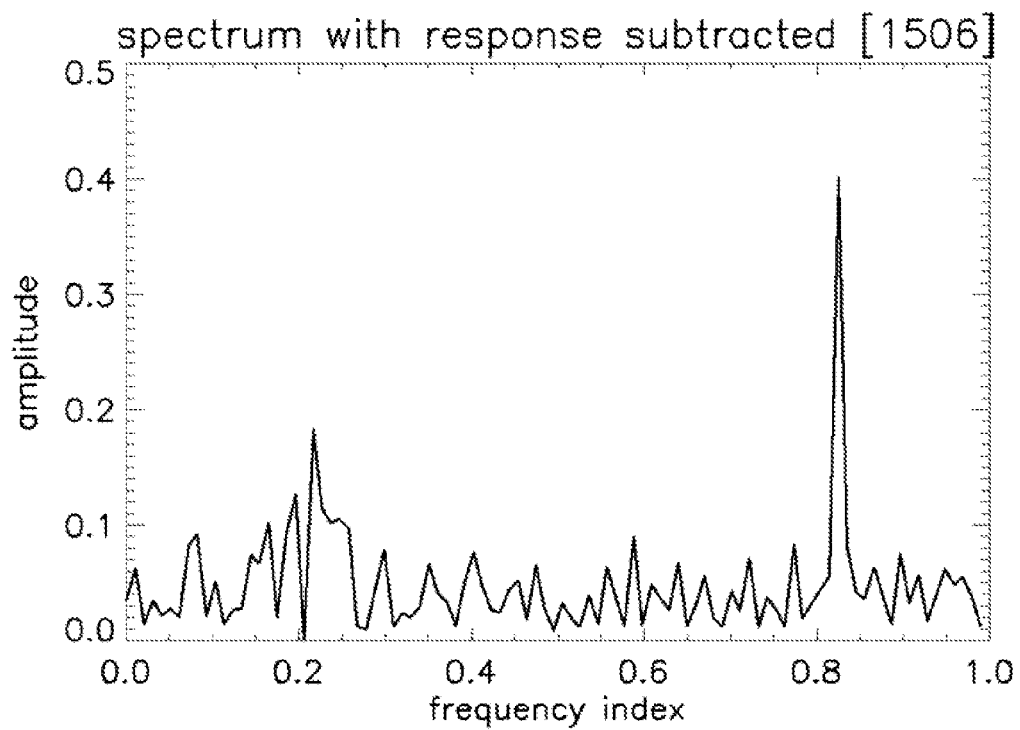

FIG. 14 illustrates an overview of a peak correction process 1400 that sets a threshold as appropriate to the uneven sampling pattern, and then iteratively processes the peaks in the sampling pattern. The description of the peak correction process 1400 will also refer to FIGS. 15A-C, which contains a plot of a measured spectrum 1502 (FIG. 15A). In step 1402, a peak over the threshold in the current unevenly sampled spectrum approximation is detected. In one approach, this is the complex amplitude of the largest peak, as shown in 1504 (FIG. 15B). In step 1404, the complex peak amplitude of the detected peak is added to the peak correction spectrum approximation. In step 1406, any sampling pattern effects due to the detected peak are removed from the current unevenly sampled spectrum approximation. In one approach, a QR sampling response of the point source 1504 (FIG. 15B) is calculated and subtracted from the measured spectrum 1502 (FIG. 15A), generating a resulting spectrum 1506 (FIG. 15C) with the QR sampling response subtracted. Then, as determined in step 1408, the process stops when the current unevenly sampled spectrum approximation is near the noise level of the detector. This peak correction process 1400 may be stable, so an over-aggressive stopping condition may have little effect on the spectral approximation.

Figure 16A:
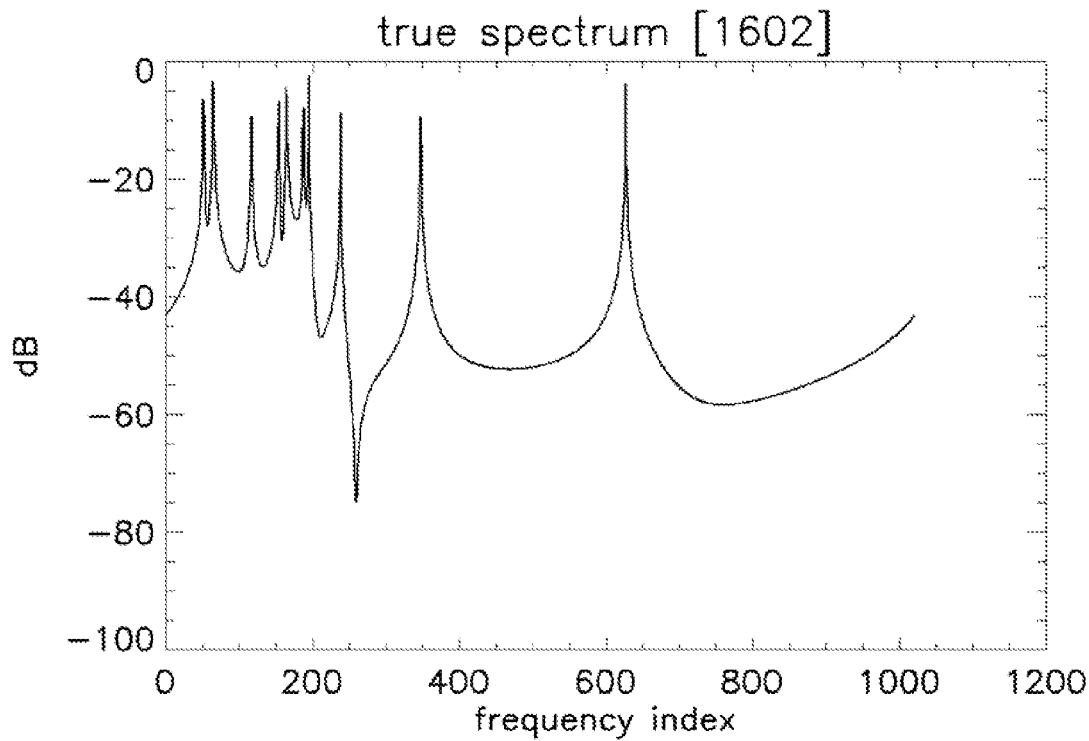
FIGS. 16A-C are plots of an approximation to the true spectrum as shown in FIGS. 13A-C when sampled using QR pattern with the peak correction process of FIG. 14.
Figure 16B:
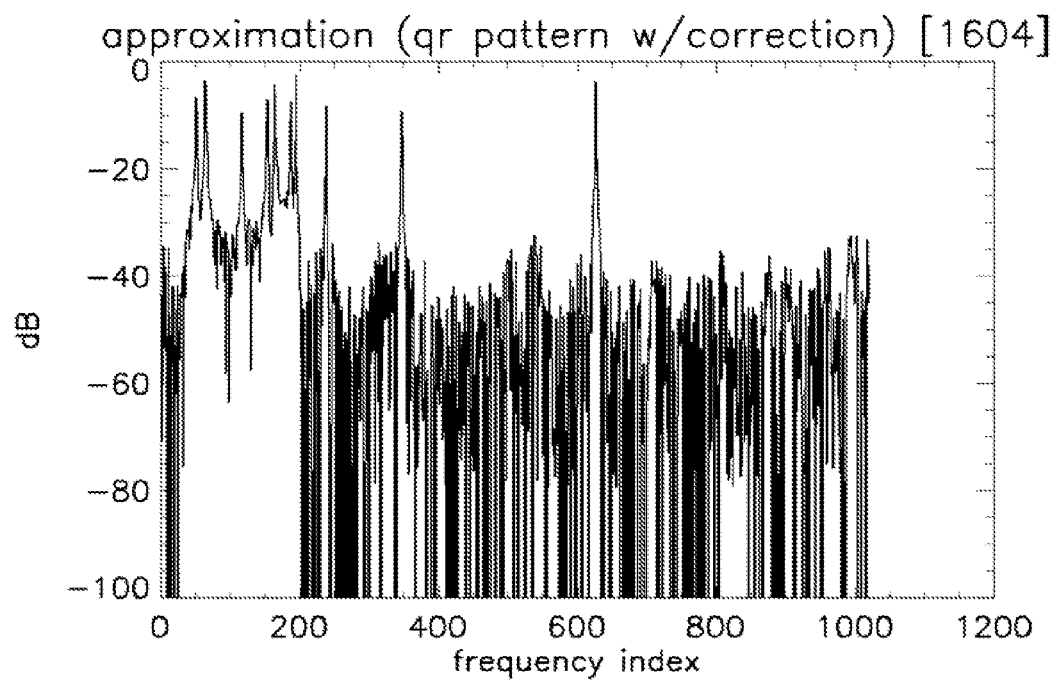
Figure 16C:
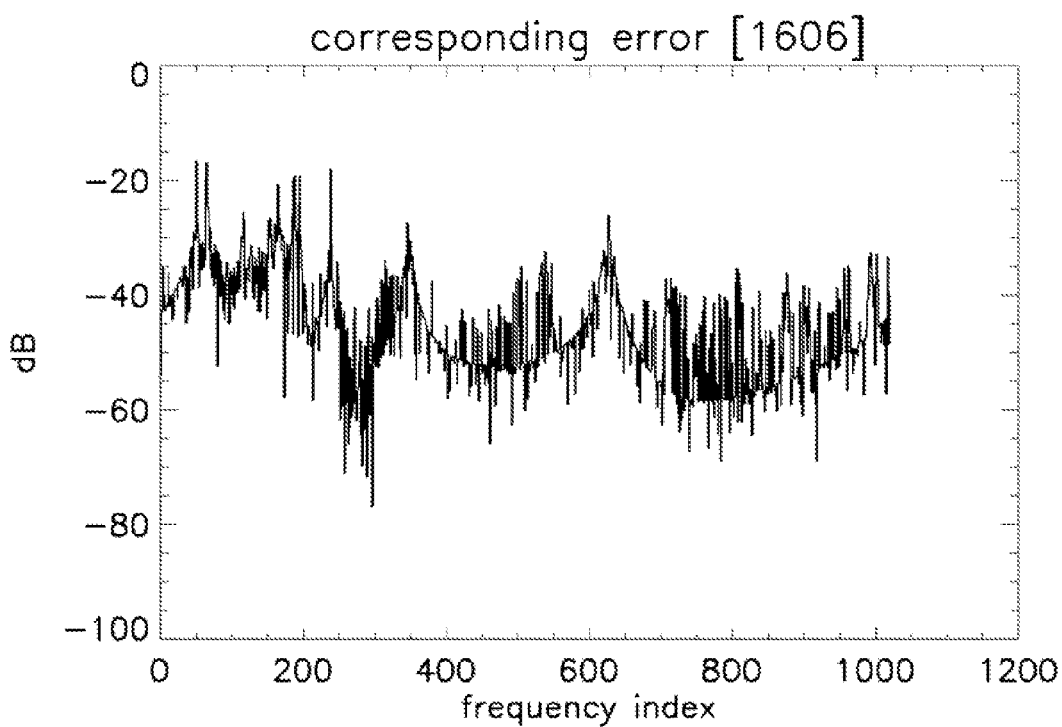

FIGS. 16A-C contain a plot of an approximation of a test spectrum (plot 1602, FIG. 16A) when sampled using a QR pattern after the peak correction process 1400 has been applied (plot 1604, FIG. 16B). FIG. 16C also contains a plot of the corresponding error (plot 1606). As illustrated in plot 1604 (FIG. 16B), this approximation detects all ten of the actual peaks in the data. The difference between plot 1604 (FIG. 16B) and plot 1304 of FIG. 13B, which is a plot of the approximation to the true spectrum when sampled using length 1021 QR pattern, is visually apparent. A characteristic of the peak correction process 1400 may be that it generally performs better with strong peaks, therefore its application to SAR imaging may improve most near strong features that are likely to be of interest.

Figure 17:
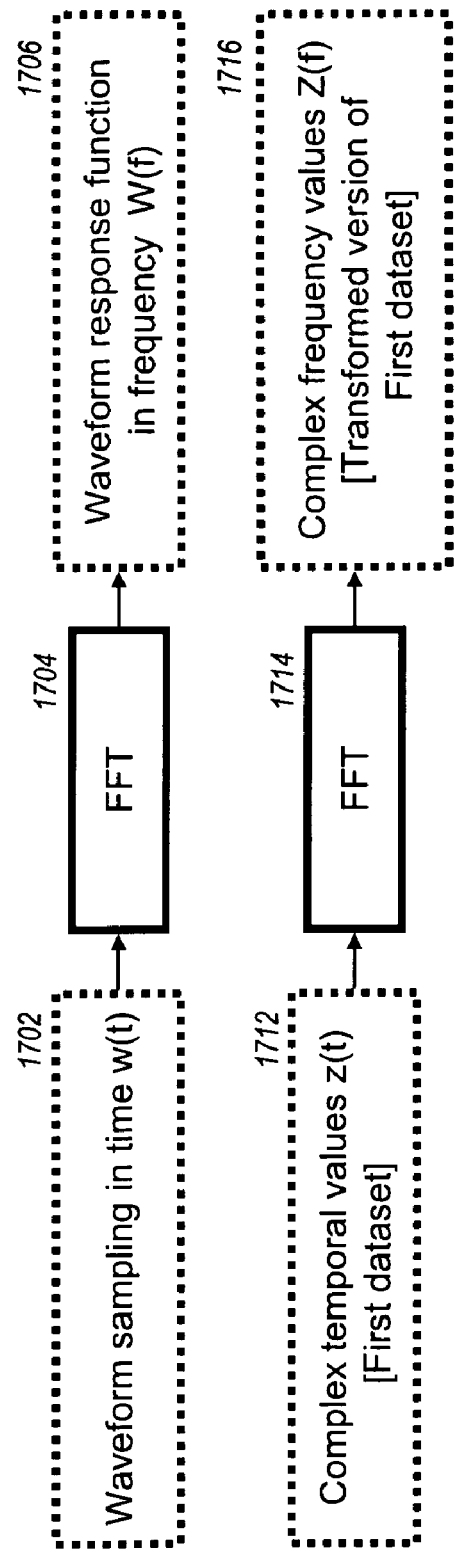
FIG. 17 is a block diagram illustrating a pair of transformations used to provide input data to an iterative process of the peak correction process of FIG. 14.
Figure 18:
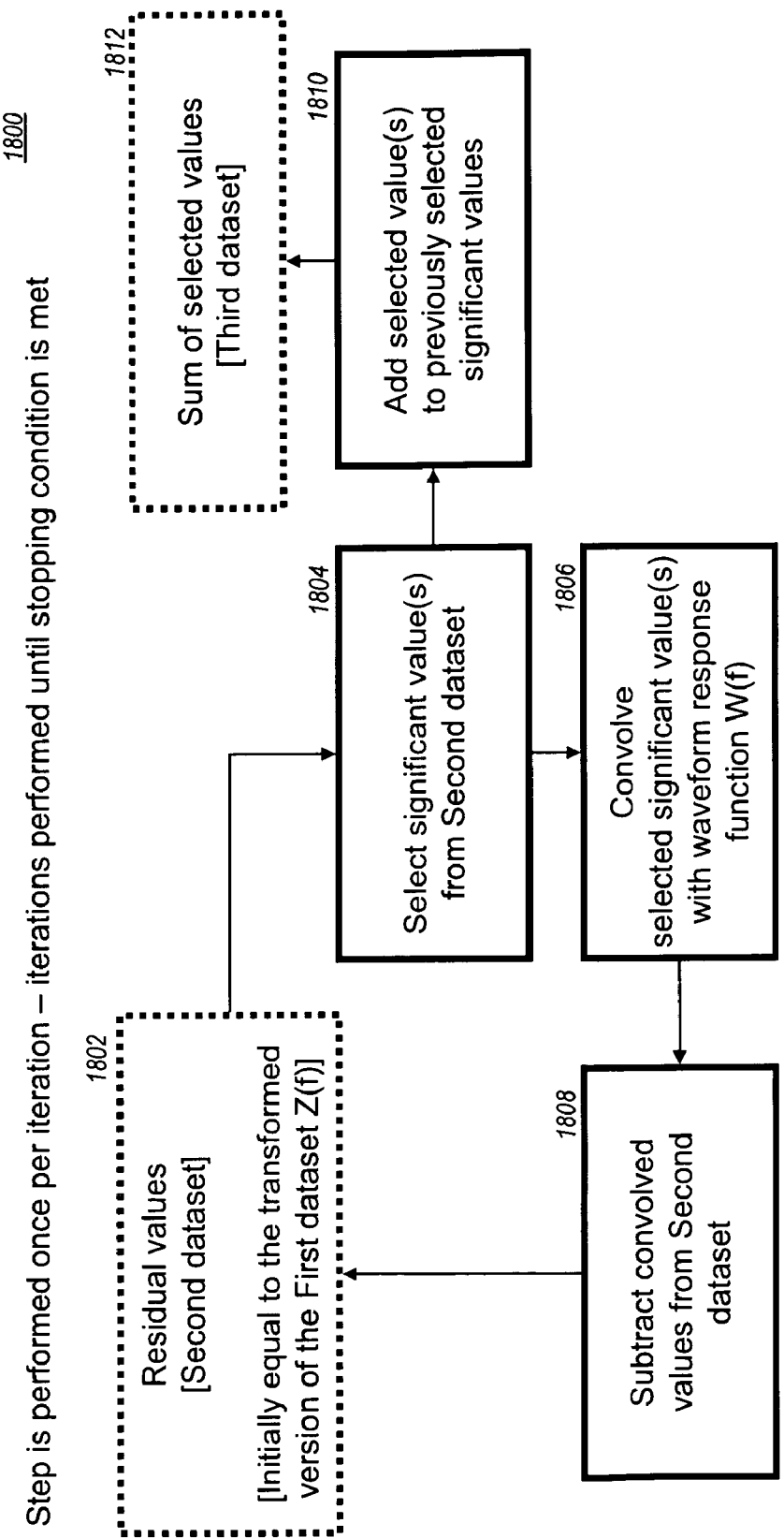
FIG. 18 is a block diagram detailing the iterative process of the peak correction process of FIG. 14.

FIG. 17 illustrates the setup for the peak correction process 1400, with an FFT block 1704 converting a waveform sampling w(t) in the time domain 1702 into a waveform response function W(f) in the frequency domain 1706, and an FFT block 1714 converting a set of received complex temporal data (a first dataset) z(t) in the time domain 1712 to a set of complex frequency data (a transformed version of the first dataset) Z(f) in the frequency domain 1716. The process then proceeds with FIG. 18, where a second dataset 1802, which is initially equal to the transformed version of the first dataset Z(f) 1716, is processed by step 1804 such that at least one significant value from the second data set is selected. The second data set 1802 will also be referred to as a residual dataset. Then, operation continues with step 1806, where the at least one selected significant value is convolved with the waveform response function W(f) 1706, the result of which is subtracted from the second data set in step 1808. Further, a third dataset 1812 is created from step 1810, where the at least one selected value in step 1804 is added to previously selected significant values. Thus, the third dataset 1812 contains a sum of selected values.

Figure 19:
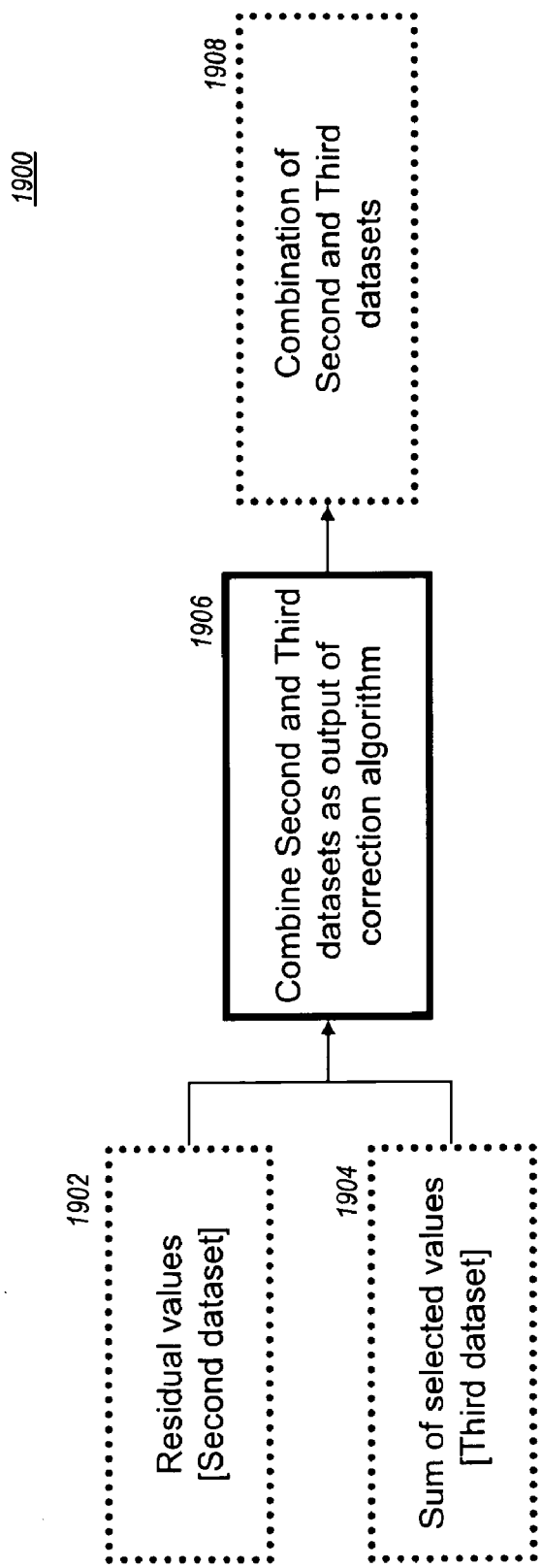
FIG. 19 is a block diagram illustrating the final step of the peak correction process.

FIG. 19 is a block diagram detailing an optional final step of the peak correction process 1400, where a final version of the second data set 1902 is added to a final version of the third dataset 1904 in block 1906 to create a combined dataset 1908. In various approaches, the term "combine" is used to describe generally what may be done with the residual dataset of second dataset 1802. For example, the residual dataset may be added back in with a multiplicative weight of one, while a multiplicative weight of zero would mean that it is effectively the same as not adding it back in. Other values may be used for the multiplicative weight.

Another way to describe the peak correction process is as follows.

Let z(r,t) represent the values of complex radar pulses at range r and time t. Range samples r are separated in range by $\Delta r$ represented by the bandwidth of the radar, and time samples t are separated in time by $\Delta t$, represented by the PRF of the radar.

For standard SAR imaging, the waveform that is used may be a fully-filled temporal aperture. Therefore, over the time period of $N*\Delta t$, where N is the number of pulses that can be collected in this time period with a given PRF, the URW representation is w(t)=1 for all t (i.e., a fully-filled temporal aperture), so the data used to generate images would be z(r, t)*w(t)=z(r,t).

In cases where the URW is not unity for all t (i.e., the URW is not fully filled), a correction may be made for the effects of the URW sampling in preparation for image generation. The effect of the waveform sampling may iteratively be corrected as follows:

Let Z(r,f)=FFT(z(r,t)*w(t)) (e.g., Z(f) 1716), where FFT is the fast Fourier transform of the sampled complex radar data for range rover a temporal subaperture period less than or equal to the full temporal aperture. The center time of the temporal subaperture is denoted by ts.

Iteratively, for data Z(r,f) at each range r, the following correction is performed:

For iteration k, a maximum magnitude of Z(r,f,k) is identified, denoted as $Z_0(k)$.

In a first part of step 1804, a threshold is selected to be a magnitude that is less than or equal to $Z_0(k)$, denoted by $Z_T(k)$.

In a second part of step 1804, an array is formed $Z'(r,f,k)$ such that:

$$Z'(r,f,k)=Z(r,f,k) \text{ if } |Z(r,f,k)| \geq Z_T(k)$$

$$Z'(r,f,k)=0 \text{ if } |Z(r,f,k)| < Z_T(k)$$

In step 1806, a correction filter is created by convolving the frequency response of the sampling filter by the array $Z'(r,f,k)$ such that $Z''(r,f,k)=Z'(r,f,k) \bigcirc W(f)$ where $W(f)=FFT(w(t))$.

In step 1808, the data is then corrected using the following approach:

$$Z(r,f,k+1)=Z(r,f,k)-Z''(r,f,k).$$

This iterative correction may be performed until a satisfaction criterion or stopping condition is achieved. Useful stopping conditions may include, but are not limited to, the following: 1) when a pre-defined number of iterations has been completed, 2) when the norm of the iterative correction is below a pre-defined threshold, 3) when the ratio between the largest peak in the residual to the mean of the residual noise level is below a pre-defined threshold, or 4) when the ratio between the norm of the residual to the norm of the original measurement is below a pre-defined threshold.

Utilizing the relationships between the sensor's attitude and state vector and the location of the area to be imaged, mapping relationships are constructed between the subaperture frame of reference (range r, frequency f, and time $t_S$ at which the subaperture is collected) and the ground plane (Cartesian positions x and y for the subaperture time $t_S$).

Temporal subapertures of n*$\Delta$t in length (sampled with the appropriate URW sampling w(t)) are used (referenced to a subaperture time $t_S$)

$z(r,t,t_S)*w(t)$ sampled as defined by the URW sampling w(t).

For each range r, $Z(r,f,t_S)$ is the URW corrected subaperture data:
1. $Z(x,y,t_S)=\text{map}(Z(r,f,t_S))$ where map is a mapping between (r,t) and (x,y) at subaperture time $t_S$.
2. Compute the complex image $Z(x,y)=\text{sum}(Z(x,y,t_S))$ where sum is linear sum over subaperture time $t_S$.

While $Z(x,y)$ is the resulting complex valued image, $|Z(x,y)^2|$ is used for the resultant detected image—for w(t)=1 for all t within each subaperture, this may be a standard SAR image.

Figure 20A:
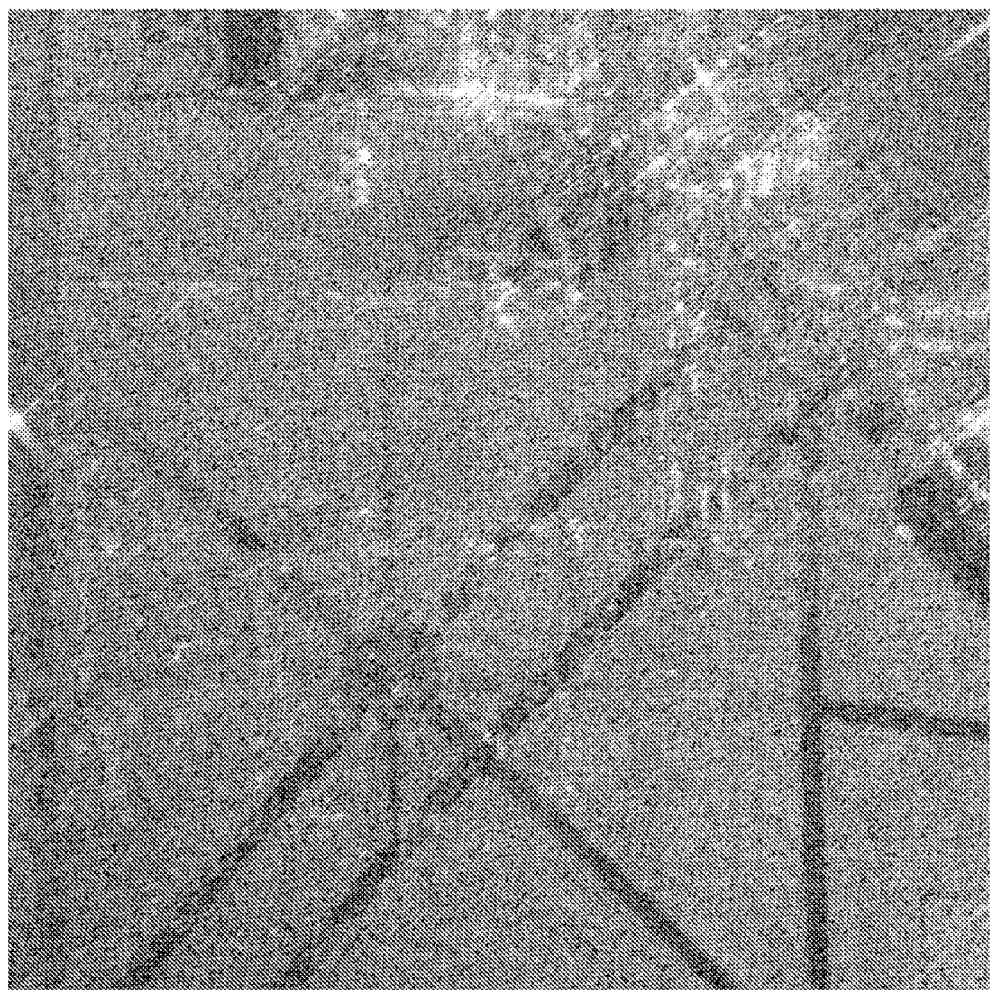
FIGS. 20A-B compare a SAR image captured using a full set of pulses to a second SAR image obtained using a QR pattern with peak correction.
Figure 20B:
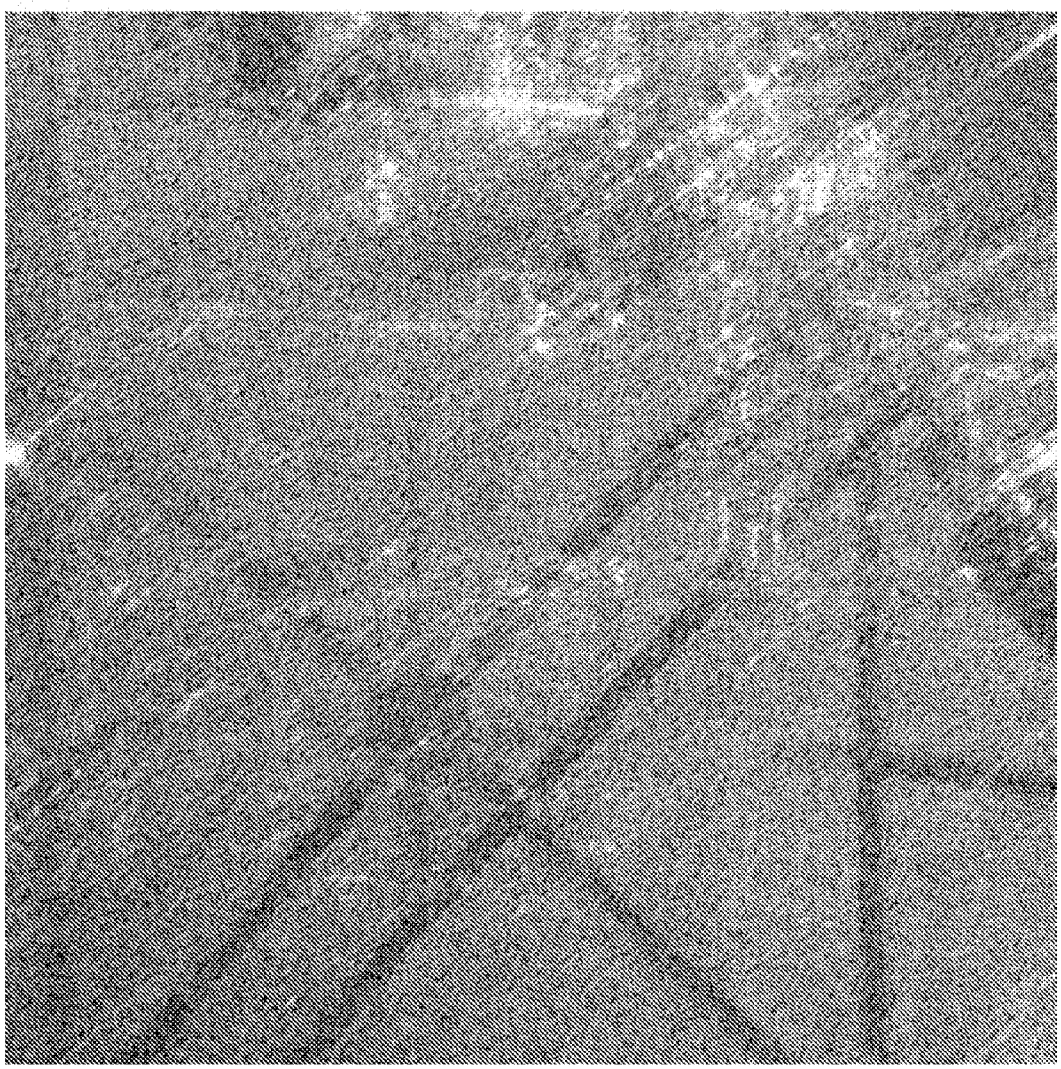

The effect of applying the QR sampling pattern coupled with the peak correction algorithm on SAR imaging is shown in FIGS. 20A-B. As can be seen, a similar quality image has been produced using approximately half of the radar pulses.

A critical benefit of these disclosed approaches may be the ability to provide quality Doppler resolution (i.e., narrow main lobe width) while simultaneously being able to resolve these Doppler frequencies unambiguously (i.e., individual sidelobes being as low as possible). Those of skill in the art will understand that radar data collected with this waveform can be used to create many useful products other than SAR images. For example, moving target indication (MTI) and high resolution terrain information (HRTI) may be two very useful radar products. The waveform and the correction algorithms described herein may allow the algorithms of these other radar products to take advantage of the fine Doppler resolution and large unambiguous Doppler frequencies that this invention can provide. The use of this waveform and the correction algorithms in conjunction with other radar algorithms should not be interpreted as causing a departure from the scope of the present invention.

In the embodiments described herein, the URW is defined and demonstrated in the time domain. However, the technology can be applied in spatial domains, where radar antenna elements may comprise an array of antenna elements and use the identical approaches to achieve similar results. The antenna elements may be unequally spaced in a manner that corresponds to any of the unequal spatial separations discussed above. The antenna elements may instead be equally spaced, but may be selectively driven by a matrix of switches that are set to cause the driven elements to be unequally spaced in a manner that corresponds to any of the unequal spatial separations discussed above.

Additionally, the technology described herein can also be applied in multiple spatial and temporal domains, where pulse streams are transmitted in time from driven radar antenna elements that comprise an array of driven antenna elements in either one or two spatial dimensions, each being coded using the methods described herein. The identical approaches of coding and applying correction algorithms may be used to achieve similar results in multidimensional spatial and temporal domains.

To illustrate these embodiments, the description of the URW coding may be generalized as follows.

A single dimension may be represented by an aperture (A) and minimum increments within the aperture ($\Delta$a). For the temporal domain, the aperture A may be a temporal aperture (T), which may be the period of time during which the radar pulses are transmitted for a finite pulse train. Similarly, for the spatial domain, the aperture A may be a spatial aperture (D), which may be the full length over which the radar pulses are transmitted for a radar transmitter of finite length.

For the temporal domain, the increments within the aperture $\Delta$a may be time increments ($\Delta$t), representing the smallest time spacing between pulses. For the spatial domain, the increments within the aperture $\Delta$a may be distance increments ($\Delta$d), representing the smallest distance spacing between antenna elements.

With standard, evenly sampled SAR waveforms, image resolution may become finer as the temporal aperture (i.e., the period of time during which the radar pulses are transmitted) used for coherent integration increases. In one approach, an uneven sampling waveform, coupled with appropriately tailored post-processing algorithms, may be used to produce images of similar quality and fewer radar pulses over the same temporal aperture.

Similarly, with standard antennae having evenly spaced elements along the aperture, angular resolution may become finer as the spatial aperture (i.e., the full length over which the radar pulses are transmitted) increases. In one approach, an uneven sampling waveform, coupled with appropriately tailored post-processing algorithms, may be used to produce radar returns of similar quality and fewer antenna elements over the same spatial aperture.

In one exemplary approach of the invention, such as in Paragraph [0064], the URW is defined in increments of $\Delta$t (i.e., the minimum time separation of the pulse train) such that the time separation between pulses is equal to integer multiples of $\Delta$t.

Similarly, in another exemplary approach, the URW can be defined in increments of $\Delta$d (i.e., the minimum element separation of the transmitter array) such that the distance separation between antenna elements is equal to integer multiples of $\Delta$d. For example, if the antenna array length is 1 meter, then a standard array over this spatial aperture of 1 meter may consist of 10 antenna elements, each separated in distance by 0.1 meters. Thus, in this approach, the URW may be defined by antenna elements that are separated by distances that are multiples of 0.1 meters (0.2, 0.3, 0.4, 0.5, 0.6, 0.7, etc.). For example, a series of antenna elements that are arranged over the 1 meter spatial aperture may be described as follows: Antenna element 2 is separated by 0.2 meters after antenna element 1, element 3 is separated by 0.1 meters after element 2, element 4 is separated by 0.4 meters after element 3, and element 5 is separated by 0.2 meters after element 4.

As in Paragraph [0065], a convenient representation of the URW may be one where a binary string of ones and zeros represents where elements within the aperture A are active or inactive. For the time domain, this may represent when pulses have or have not been transmitted at a given time within the temporal aperture. For the spatial domain, this may represent that a pulse is or is not transmitted from a given antenna element within the spatial aperture.

Whether the aperture represents the time domain or the spatial domain, as in the examples above in Paragraph [0064] or Paragraph [00131], if a one ("1") represents that an element is active at that integer multiple of $\Delta a$ within the aperture A and a zero ("0") represents that an element is not active at that integer multiple of $\Delta a$ within the aperture A, the URW example can be represented by a 10 character binary string [1,0,1,1,0,0,0,1,0,1]. Similarly, a standard waveform with a fully filled aperture can be represented as [1,1,1,1,1,1,1,1,1,1].

In radar applications such as imaging and moving target indication (MTI), the response function of the URW pattern may be very important.

In the temporal domain, the URW is defined as a function of time (e.g., integer increments of $\Delta t$), so a Fourier representation (decomposition in sine and cosine waves) shows how the URW is defined in frequency. In the spatial domain, the URW is defined as a function of distance (e.g., integer increments of $\Delta d$), so a Fourier representation (decomposition in sine and cosine waves) shows how the URW is defined in angle.

Different radar applications may be optimized by ensuring or designing certain characteristics in the Fourier transform of the URW. With the inventive sampling and processing techniques disclosed herein, these characteristics may be selected and utilized without sacrificing operational efficiency or radar output qualities.

In radar applications, the narrowness of the width of the main lobe of the URW response may correspond to the radar resolution (whether frequency in the time domain or angle in the spatial domain).

A narrow main lobe may mean that the bulk of the energy response occurs in a narrow range. This may indicate that the observed energy at a particular frequency (or angle) generally occurs as the result of energy that is actually present at that frequency (or angle) and no others. Flat sidelobes may mean that frequencies (or angles) other than that of the main lobe have low energy responses. This may indicate that the observed energy at a particular frequency (or angle) generally does not respond to frequencies (or angles) other than the frequency (or angle) of interest.

In other words, having flat sidelobes may mean that the resultant sidelobe energy of the waveform response is distributed as evenly as possible. This even distribution may ensure that any single sidelobe peak is as low as possible relative to the main lobe peak. Flat sidelobes may maximize the main lobe-to-maximum sidelobe energy ratio. In the temporal domain, this may result in elimination of temporal aliasing of the frequency response. In the spatial domain, this may result in elimination of grating lobes of the antenna response.

Whether considering the temporal domain or the spatial domain, these sidelobe characteristics of the response function may be identical, even though those skilled in the art may attribute them to different phenomena based upon the domain upon which is being focused. Those skilled in the art will recognize and appreciate that other radar applications may have different desired optimal Fourier transform characteristics.

The primary characteristics of URW coding may be that (1) the spacings between active elements (whether they are in the temporal domain, where an active element represents that a pulse is transmitted at that integer multiple of $\Delta t$, or in the spatial domain, where an active element represents that a pulse is transmitted at that antenna element) may be uneven, and that (2) the URW response function may have a narrow main lobe and resultant sidelobe energy that is distributed as evenly as possible. The URW examples above show that the spacing separations may be substantially unequal. For example, the separation between at least two neighboring active elements may be at least equal to twice the shortest separation between all of the other neighboring active elements in the set. "Substantially unequal" is intended to distinguish between minor spatial and/or temporal variations due to loose factory tolerances which do not effectuate the goals/benefits which have been discussed herein from those variations which do.

One embodiment of this technology may be where radar pulses are transmitted in a single dimension, where the aperture is defined in the time domain, and the URW represents the time locations of active pulses within the pulse train, or over the temporal aperture.

Another embodiment of this technology may be where radar pulses are transmitted in a single dimension, where the aperture is defined in the spatial domain, and the URW represents the locations of active antenna elements within the antenna array, or over the spatial aperture.

Further embodiments of the technology can be described by combining the URW coding descriptions in multiple dimensions.

In one exemplary embodiment, finite arrays of antennas can be arranged in two dimensions (for example, one horizontal and one vertical). When there is a two-dimensional antenna array, there may be two angles of interest for the angular response function, which may be generally described as azimuth angle (for the horizontal) and elevation angle (for the vertical). In this case, the two-dimensional URW response may be in azimuth angle and in elevation angle.

In another exemplary embodiment, URW coding can be applied in the temporal domain and with a antenna array arranged in a single spatial dimension. In this case, the two-dimensional URW response may be in frequency and in angle, respectively.

In yet another exemplary embodiment, URW coding can be applied in the temporal domain and with a antenna array arranged in two spatial dimensions. In this case, the three-dimensional URW response may be in frequency, in azimuth angle, and in elevation angle.

URW coding in multiple dimensions may achieve the same results as for one dimension, yielding beneficial main lobe and sidelobe characteristics in the URW response functions and the appropriate post-processing algorithms to achieve sidelobe energy reduction.

An illustrative embodiment for multidimensional URW coding utilizes the combination of URW codes of single dimensions in the following way. Let $URW_1$ (i) be the ith element of the URW code in the first dimension having $n_1$ elements, and let $URW_2$ (j) be the jth element of the URW code in the second dimension having $n_2$ elements. Then, the two dimensional URW code may be represented by:

$URW(i,j)=0$ for all $j$ when $i=1$ $URW(i,j)=1$ for all $i\neq 1$ when $j=1$ $URW(i,j)=(URW_1(i)+URW_2(j)+nstates-1)\mod nstates,$ where nstates is equal to the total number of available states in the URW code, for all other (i,j).

In this example, there may be only two states, zero ("0") and one ("1"), so nstates is equal to 2 and the modular arithmetic occurs in base 2.

As an example, let $URW_1=[1,0,1,1,0]$ and let $URW_2=[1,1,0,1,0]$. The combined two-dimensional URW code may then be:

```
1 0 1 1 0
1 0 1 1 0
1 1 0 0 1
1 0 1 1 0
0 0 0 0 0
```

Figure 21:
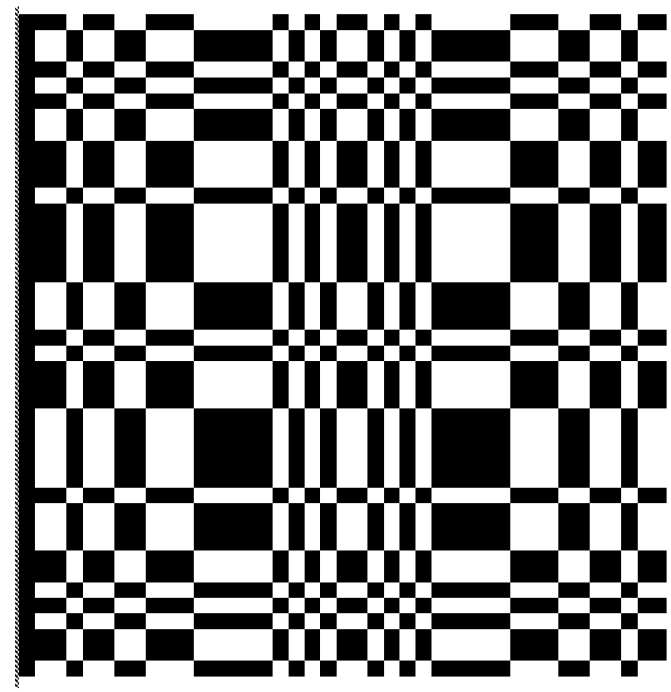
FIG. 21 illustrates the two dimensional URW code where the one dimensional URW codes are quadratic residue (QR) codes of length 41 and 43, respectively.
Figure 22:
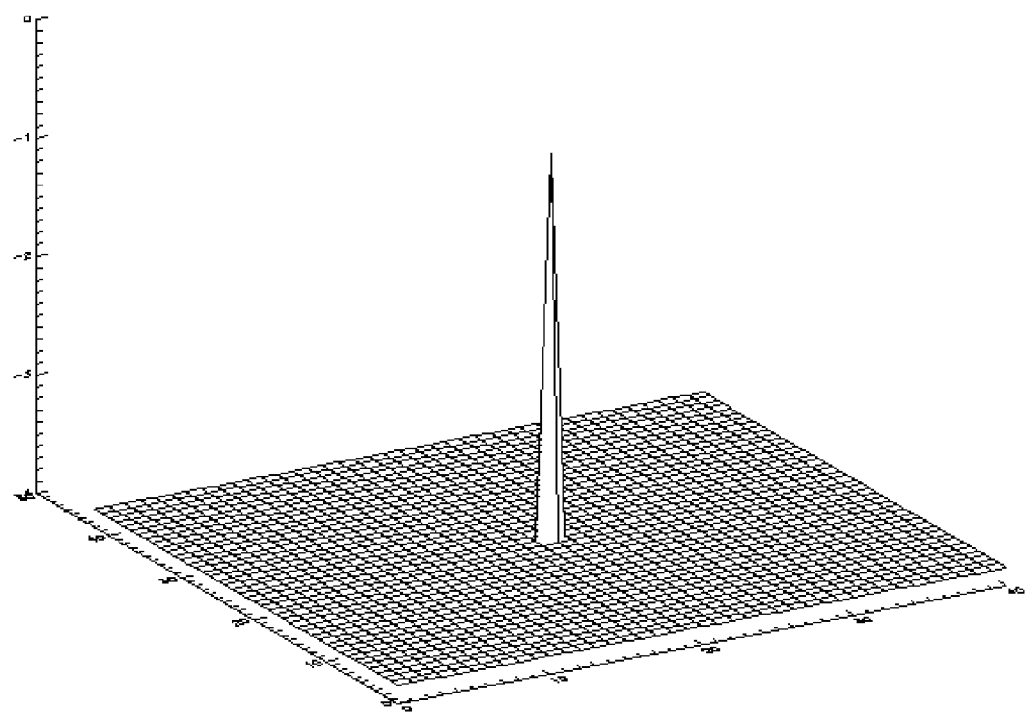
FIG. 22 shows the URW response function for the two-dimensional URW code illustrated in FIG. 21 in logarithmic units.

As another illustrative example, FIG. 21 shows the two dimensional URW code where the one dimensional URW codes are quadratic residue (QR) codes of length 41 and 43, respectively. FIG. 22 shows the URW response function for this two-dimensional URW code in logarithmic units. Note the desired response characteristics of the narrow main lobe and flat sidelobes.

While the above URW coding examples illustrate the desired coding and response function characteristics, these illustrations may not preclude the use of other coding methods that achieve similar coding and response function characteristics. Additionally, nothing in this description precludes the use of more than two states in the single dimension URW codes or in the multidimensional combination of URW codes.

One such consideration for uneven sampling comes from the idea of random or pseudo-random patterns. While these properties may not be achieved by all random patterns nor quite as well as the QR patterns, the flexibility of designing uneven sampling patterns of arbitrary lengths and fractions may make such patterns useful. URW codes of single dimension can be generated using pseudorandom patterns, and combined as described above.

Another embodiment can fill the multidimensional URW coding array with pseudorandom numbers without regard to the one dimensional URW coding combination method described above.

Use of a multidimensional URW response can result in a URW response of lower dimensions. For example, let the multidimensional URW code be equal to:

```
1 0 1 1 0
1 0 1 1 0
1 0 1 1 0
1 0 1 1 0
1 0 1 1 0
```

This results in a two-dimensional URW coding array where all five rows are equal to [1,0,1,1,0]. This embodiment could equivalently be modeled as a one-dimensional antenna array, coded with a single URW code of [1,0,1,1,0].

One embodiment of this technology may be in two dimensions, where the dimensions are time and one spatial dimension.

Another embodiment of this technology may be in two dimensions, where the dimensions are two spatial dimensions.

Another embodiment of this invention may be in three dimensions, where the dimensions are time and two spatial dimensions.

The URW correction algorithms described herein may operate identically in multiple dimensions as they have been demonstrated in a single dimension.

As an illustrative example, let $z(\bar{a})$ represent the values of complex radar pulses at various points in a dimension space $\bar{a}$, where $\bar{a}$ may be in one or more dimensions. Samples $a_i$ in each dimension are separated within dimension i by $\Delta a_i$. These increments within the aperture $\Delta a$ could be time increments ($\Delta t$) in the temporal domain or distance increments ($\Delta d$) in the spatial domain.

The URW coding has the effect of sampling these complex radar values as $z(\bar{a})*w(\bar{a})$, where $w(\bar{a})$ is the URW coding array in multiple dimensions, and the correction algorithm is applied as before, but in multiple dimensions using the URW response function $W(\tilde{a})=FFT(w(\bar{a}))$.

FIG. 23 illustrates an exemplary radar system 2100 that may be used in the implementation of the URW, including a transmitter 2102, a duplexer 2110, a receiver 2120, a signal processor 2130, and a radar controller 2140. The transmitter 2102 may be configured to generate a radio signal with an oscillator such as a klystron or a magnetron 2104, while the duration and sequence of pulses, may be controlled by a modulator 2106. A waveguide (not shown) may link the transmitter 2102 and the antenna 2190, while the duplexer 2110 may serve as a switch between the antenna 2190 and the transmitter 2102 or the receiver 2120 for transmitting or receiving signals when the antenna is used in both situations. The received signals from the receiver 2120 may be processed by the signal processor 2130 before being further analyzed by the radar controller 2140, which may control all the elements in radar system 2100 to perform radar scans using the URW as described herein.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processing system may include a processor and memory, as well as a combination of other components.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The hardware, including the ASIC, may reside in a radar platform. In the alternative, the processor and the storage medium may reside as discrete components in the radar platform.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A radar transmission system comprising:
a transmitter system configured to generate one or more radar signals; and
an antenna system having spatially-separated elements and configured to radiate the one or more radar signals from the spatially-separated elements,
wherein the transmitter system and/or the antenna system are configured such that the radiated radar signals include a pattern of spatially-separated radar pulses, each from a different one of the spatially-separated antenna elements, the pattern of pulses having:
at least two neighboring radar pulses that have a spatial separation that is substantially unequal to the spatial separation between at least two other neighboring radar pulses in the pattern of pulses;
a mainlobe radiation pattern with a width that is near or substantially equal to the minimum possible mainlobe width; and
sidelobe radiation patterns with substantially even energy distribution.

2. The radar transmission system of claim 1 further comprising a processing system configured to generate pulses using a Fourier transform which are used by the transmitter system to generate the one or more radar signals.

3. The radar transmission system of claim 1 wherein the radiated pattern of pulses has a quadratic residue (QR) pattern.

4. The radar transmission system of claim 1 wherein the radiated pattern of pulses has a pseudo-random pattern.

5. The radar transmission system of claim 1 wherein:
the elements of the antenna system are spatially-separated in two dimensions;
the pattern of radar pulses includes pulses spatially-separated in the two dimensions, and
the substantially unequal separation includes substantially unequal separation in the spatial locations from which the radar pulses are radiated by the antenna system in both of the two dimensions.

6. The radar transmission system of claim 1 wherein the transmitter system is configured such that the radiated radar signals include a pattern of time-separated radar pulses having at least two sequential radar pulses with a time separation that is substantially unequal to the time separation between at least two other sequential radar pulses in the pattern of pulses.

7. The radar transmission system of claim 1 wherein the antenna elements are unequally spaced.

8. The radar transmission system of claim 1 wherein the antenna elements are equally spaced, but the transmission system is configured to selectively drive the elements so as to cause the driven elements to have the substantially unequal spatial separations.

9. Non-transitory, tangible, computer-readable storage media containing programming code which, when executed by a computer system, causes an antenna system to radiate radar signals which include a pattern of pulses having:
at least two neighboring radar pulses that have a spatial separation that is substantially unequal to the spatial separation between at least two other neighboring radar pulses in the pattern of pulses; and
a mainlobe radiation pattern with a width that is near or substantially equal to the minimum possible mainlobe width; and sidelobe radiation patterns with substantially even energy distribution.

10. The computer-readable storage media of claim 9 wherein the programming code, when executed by a computer system, causes the computer system to generate pulses using a Fourier transform which are converted into the radar signals by a transmitter system.

11. The computer-readable storage media of claim 9 wherein the pattern of radar pulses has a quadratic residue (QR) pattern.

12. The computer-readable storage media of claim 9 wherein the pattern of radar pulses has a pseudo-random pattern.

13. The computer-readable storage media of claim 9 wherein
the pattern of radar pulses includes pulses spatially-separated in two dimensions; and
the substantially unequal separation includes substantially unequal separation in both of the two dimensions.

14. The computer-readable storage media of claim 9 wherein the programming code, when executed by the computer system, causes the radiated radar signals to include a pattern of time-separated radar pulses having at least two sequential radar pulses with a time separation that is substantially unequal to the time separation between at least two other sequential radar pulses in the pattern of pulses.

15. A radar reception system comprising:
a receiver configured to receive a radar signal which includes a first data set having a plurality of values based on a radar waveform return from a set of transmitted radar pulses; and
a processing system configured to create a second data set comprising the first data set minus at least one significant value from the first data set and its effects on other values within the first data set when the set of transmitted radar pulses was transmitted with:
a spatial separation between at least two neighboring pulses that is substantially unequal to the spatial separation between at least two other neighboring pulses in the set;
a mainlobe radiation pattern with a width that is near or substantially equal to the minimum possible width; and
sidelobe radiation patterns with a substantially even distribution of energy.

16. The radar reception system of claim 15 wherein the processing system is configured to:
create a third data set comprising the at least one significant value from the first data set; and
combine the second and third datasets.

17. The radar reception system of claim 15 wherein the first data set includes a plurality of transformed values.

18. The radar reception system of claim 17 wherein the plurality of transformed values are frequency values.

19. The radar reception system of claim 15 wherein the at least one significant value includes a peak value in a frequency domain.

20. The radar reception system of claim 15 wherein the second data set includes a number of peak values from the first data set chosen based on predetermined selection criteria.

21. The radar reception system of claim 15 wherein the processing system is configured to determine the effects of the at least one significant value by calculating a plurality of propagated effects from the at least one significant value.

22. The radar reception system of claim 15 wherein the processing system is configured to create the second data set by:
identifying at least one peak value in the first data set;
creating a peak correction function approximation using the at least one peak value; and
removing the peak correction function approximation from the first data.

23. The radar reception system of claim 15 wherein:
the pattern of radar pulses includes pulses spatially-separated in two dimensions; and
the substantially unequal separation includes substantially unequal separation in both of the two dimensions.

24. The radar reception system of claim 15 wherein the radiated radar signals include a pattern of time-separated radar pulses having at least two sequential radar pulses with a time separation that is substantially unequal to the time separation between at least two other sequential radar pulses in the pattern of pulses.

25. Non-transitory, tangible, computer-readable storage media containing programming code which, when executed by a computer system, creates a second data set comprising a first data set having a plurality of values based on a radar waveform return from a set of transmitted radar pulses minus at least one significant value from the first data set and its effects on other values within the first data set when the set of transmitted radar pulses has:
a spatial separation between at least two neighboring pulses that is substantially unequal to the spatial separation between at least two other neighboring pulses in the set;
a mainlobe radiation pattern with a width that is near or substantially equal to the minimum possible width; and
sidelobe radiation patterns with a substantially even distribution of energy.

26. The computer-readable storage media of claim 25 wherein the programming code, when executed by the computer system:
creates a third data set comprising the at least one significant value from the first data set; and
combines the second and third datasets.

27. The computer-readable storage media of claim 25 wherein the first data set includes a plurality of transformed values.

28. The computer-readable storage media of claim 27 wherein the plurality of transformed values are frequency values.

29. The computer-readable storage media of claim 25 wherein the at least one significant value includes a peak value in a frequency domain.

30. The computer-readable storage media of claim 25 wherein the second data set includes a number of peak values from the first data set chosen based on predetermined selection criteria.

31. The computer-readable storage media of claim 25 wherein the programming code, when executed by the computer system, determines the effects of the at least one significant value by calculating a plurality of propagated effects from the at least one significant value.

32. The computer-readable storage media of claim 25 wherein the programming code, when executed by the computer system, creates the second data set by:
identifying at least one peak value in the first data set;
creating a peak correction function approximation using the at least one peak value; and
removing the peak correction function approximation from the first data.

33. The computer-readable storage media of claim 25 wherein:

the set of radar pulses are spatially-separated in two dimensions; and the substantially unequal separation includes substantially unequal separation in both of the two dimensions.

34. The computer-readable storage media of claim 25 wherein the set of radar pulses include a pattern of time-separated radar pulses having at least two sequential radar pulses with a time separation that is substantially unequal to the time separation between at least two other sequential radar pulses in the pattern of pulses.

35. A radar transmission system comprising:
a transmitter system configured to generate one or more radar signals; and
an antenna system having spatially-separated elements and configured to radiate the one or more radar signals from the spatially-separated elements,
wherein the transmitter system and/or the antenna system are configured such that the radiated radar signals include a pattern of spatially-separated radar pulses, each from a different one of the spatially-separated antenna elements, the pattern of radar pulses having at least two neighboring radar pulses that have a spatial separation that is at least twice the shortest spatial separation between at least two other neighboring radar pulses in the pattern of pulses.

36. The radar transmission system of claim 35 further comprising a processing system configured to generate pulses using a Fourier transform which are used by the transmitter system to generate the one or more radar signals.

37. The radar transmission system of claim 35 wherein the radiated pattern of pulses has a quadratic residue (QR) pattern.

38. The radar transmission system of claim 35 wherein the radiated pattern of pulses has a pseudo-random pattern.

39. The radar transmission system of claim 35 wherein:
the elements of the antenna system are spatially-separated in two dimensions;
the pattern of radar pulses includes pulses spatially-separated in the two dimensions, and
the substantially unequal separation includes substantially unequal separation in the spatial locations from which the radar pulses are radiated by the antenna system in both of the two dimensions.

40. The radar transmission system of claim 35 wherein the transmitter system is configured such that the radiated radar signals include a pattern of time-separated radar pulses having at least two sequential radar pulses with a time separation that is substantially unequal to the time separation between at least two other sequential radar pulses in the pattern of pulses.

41. The radar transmission system of claim 35 wherein the antenna elements are unequally spaced.

42. The radar transmission system of claim 35 wherein the antenna elements are equally spaced, but the transmission system is configured to selectively drive the elements so as to cause the driven elements to have the substantially unequal spatial separations.

43. Non-transitory, tangible, computer-readable storage media containing programming code which, when executed by a computer system, causes an antenna system to radiate radar signals which include a pattern of pulses having at least two neighboring radar pulses that have a spatial separation that is at least twice the shortest spatial separation between at least two other neighboring radar pulses in the pattern of pulses.

44. The computer-readable storage media of claim 43 wherein the programming code, when executed by a computer system, causes the computer system to generate pulses using a Fourier transform which are converted into the radar signals by a transmitter system.

45. The computer-readable storage media of claim 43 wherein the pattern of radar pulses has a quadratic residue (QR) pattern.

46. The computer-readable storage media of claim 43 wherein the pattern of radar pulses has a pseudo-random pattern.

47. The computer-readable storage media of claim 43 wherein
the pattern of radar pulses includes pulses spatially-separated in two dimensions; and
the substantially unequal separation includes substantially unequal separation in both of the two dimensions.

48. The computer-readable storage media of claim 43 wherein the programming code, when executed by the computer system, causes the radiated radar signals to include a pattern of time-separated radar pulses having at least two sequential radar pulses with a time separation that is substantially unequal to the time separation between at least two other sequential radar pulses in the pattern of pulses.

49. A radar reception system comprising:
a receiver configured to receive a radar signal which includes a first data set having a plurality of values based on a radar waveform return from a set of transmitted radar pulses; and
a processing system configured to create a second data set comprising the first data set minus at least one significant value from the first data set and its effects on other values within the first data set when the set of transmitted radar pulses was transmitted with a pattern of radar pulses having at least two neighboring radar pulses that have a spatial separation that is at least twice the shortest spatial separation between at least two other neighboring radar pulses in the pattern of pulses.

50. The radar reception system of claim 49 wherein the processing system is configured to:
create a third data set comprising the at least one significant value from the first data set; and
combine the second and third datasets.

51. The radar reception system of claim 49 wherein the first data set includes a plurality of transformed values.

52. The radar reception system of claim 51 wherein the plurality of transformed values are frequency values.

53. The radar reception system of claim 49 wherein the at least one significant value includes a peak value in a frequency domain.

54. The radar reception system of claim 49 wherein the second data set includes a number of peak values from the first data set chosen based on predetermined selection criteria.

55. The radar reception system of claim 49 wherein the processing system is configured to determine the effects of the at least one significant value by calculating a plurality of propagated effects from the at least one significant value.

56. The radar reception system of claim 49 wherein the processing system is configured to create the second data set by:
identifying at least one peak value in the first data set;
creating a peak correction function approximation using the at least one peak value; and
removing the peak correction function approximation from the first data.

57. The radar reception system of claim 49 wherein:
the pattern of radar pulses includes pulses spatially-separated in two dimensions; and
the substantially unequal separation includes substantially unequal separation in both of the two dimensions.

58. The radar reception system of claim 49 wherein the radiated radar signals include a pattern of time-separated radar pulses having at least two sequential radar pulses with a time separation that is substantially unequal to the time separation between at least two other sequential radar pulses in the pattern of pulses.

59. Non-transitory, tangible, computer-readable storage media containing programming code which, when executed by a computer system, creates a second data set comprising a first data set having a plurality of values based on a radar waveform return from a set of transmitted radar pulses minus at least one significant value from the first data set and its effects on other values within the first data set when the set of transmitted radar pulses has at least two neighboring radar pulses that have a spatial separation that is at least twice the shortest spatial separation between at least two other neighboring radar pulses in the pattern of pulses.

60. The computer-readable storage media of claim 59 wherein the programming code, when executed by the computer system:
 creates a third data set comprising the at least one significant value from the first data set; and
 combines the second and third datasets.

61. The computer-readable storage media of claim 59 wherein the first data set includes a plurality of transformed values.

62. The computer-readable storage media of claim 61 wherein the plurality of transformed values are frequency values.

63. The computer-readable storage media of claim 59 wherein the at least one significant value includes a peak value in a frequency domain.

64. The computer-readable storage media of claim 59 wherein the second data set includes a number of peak values from the first data set chosen based on predetermined selection criteria.

65. The computer-readable storage media of claim 59 wherein the programming code, when executed by the computer system, determines the effects of the at least one significant value by calculating a plurality of propagated effects from the at least one significant value.

66. The computer-readable storage media of claim 59 wherein the programming code, when executed by the computer system, creates the second data set by:
 identifying at least one peak value in the first data set;
 creating a peak correction function approximation using the at least one peak value; and
 removing the peak correction function approximation from the first data.

67. The computer-readable storage media of claim 59 wherein:
 the set of radar pulses are spatially-separated in two dimensions; and
 the substantially unequal separation includes substantially unequal separation in both of the two dimensions.

68. The computer-readable storage media of claim 59 wherein the set of radar pulses include a pattern of time-separated radar pulses having at least two sequential radar pulses with a time separation that is substantially unequal to the time separation between at least two other sequential radar pulses in the pattern of pulses.

* * * * *